(12) United States Patent
Singhal et al.

(10) Patent No.: US 12,119,007 B2
(45) Date of Patent: Oct. 15, 2024

(54) DYNAMICALLY ADAPTING FULFILLMENT OF A GIVEN SPOKEN UTTERANCE BASED ON A USER THAT PROVIDED THE GIVEN SPOKEN UTTERANCE

(71) Applicant: GOOGLE LLC, Mountain View, CA (US)

(72) Inventors: Amit Singhal, Sunnyvale, CA (US); Dev M. Patel, San Francisco, CA (US); Yao Lin, Sunnyvale, CA (US); Arvind Sivaram Sharma, Mountian View, CA (US); Srikrishnan Subramanian, Fremont, CA (US)

(73) Assignee: GOOGLE LLC, Mountain View, CA (US)

( * ) Notice: Subject to any disclaimer, the term of this patent is extended or adjusted under 35 U.S.C. 154(b) by 288 days.

(21) Appl. No.: 17/692,743

(22) Filed: Mar. 11, 2022

(65) Prior Publication Data

US 2023/0290359 A1    Sep. 14, 2023

(51) Int. Cl.
*G10L 17/22* (2013.01)
*B60R 16/037* (2006.01)
(Continued)

(52) U.S. Cl.
CPC .......... *G10L 17/22* (2013.01); *B60R 16/0373* (2013.01); *G06V 40/172* (2022.01); *G10L 17/06* (2013.01)

(58) Field of Classification Search
CPC ......... G10L 17/22; G10L 17/06; G10L 17/00; G10L 17/005; G10L 15/22; G10L 15/26;
(Continued)

(56) References Cited

U.S. PATENT DOCUMENTS

2020/0175983 A1    6/2020   Goodman
2020/0388285 A1    12/2020  Spiewla
(Continued)

OTHER PUBLICATIONS

European Patent Office; International Search Report and Written Opinion issued in Application No. PCT/US2022/035962; 15 pages; dated Dec. 7, 2022.
(Continued)

*Primary Examiner* — Yogeshkumar Patel
(74) *Attorney, Agent, or Firm* — Gray Ice Higdon

(57) ABSTRACT

Implementations described herein relate to determining how to fulfill a spoken utterance based on a user that provided the spoken utterance. For example, implementations can receive a spoken utterance from a user, determine a set of fulfillment actions for the spoken utterance, and determine whether the user that provided the spoken utterance corresponds to a first user or a second user. Further, and in response to determining that the user corresponds to the first user, implementations can select a subset of first fulfillment action(s) from the set, and cause the subset of first fulfillment action(s) to be implemented to satisfy the spoken utterance. Moreover, and in response to determining that the user corresponds to the second user, implementations can select a subset of distinct, second fulfillment action(s) from the set, and cause the subset of second fulfillment action(s) to be implemented to satisfy the spoken utterance.

20 Claims, 9 Drawing Sheets

(51) Int. Cl.
*G06V 40/16* (2022.01)
*G10L 17/06* (2013.01)

(58) Field of Classification Search
CPC . G10L 15/1815; G10L 15/1822; G10L 75/78; G10L 2015/223; G06F 3/167; G06F 3/165; B60R 16/0373; G06V 40/172
See application file for complete search history.

(56) References Cited

U.S. PATENT DOCUMENTS

2020/0411009 A1   12/2020  Sung et al.
2021/0157542 A1*  5/2021  De Assis ............... G06F 16/436
2021/0335348 A1* 10/2021  Aggarwal ............... G06F 3/167

OTHER PUBLICATIONS

Gore, Ajinkya; New!! Enhanced Car Control capability allows customers to personalize their Alexa in-vehicle experience; retrieved from the internet: https://developer.amazon.com/en-US/blogs/alexa/alexa-auto/2021/12/enhanced-car-control; 3 pages; dated Dec. 22, 2021.

* cited by examiner

DYNAMICALLY ADAPTING FULFILLMENT OF A GIVEN SPOKEN UTTERANCE BASED ON A USER THAT PROVIDED THE GIVEN SPOKEN UTTERANCE

BACKGROUND

Humans may engage in human-to-computer dialogs with interactive software applications referred to herein as "automated assistants" (also referred to as "chatbots," "interactive personal assistants," "intelligent personal assistants," "personal voice assistants," "conversational agents," etc.). For example, humans (which when they interact with automated assistants may be referred to as "users") may provide spoken natural language input (i.e., spoken utterances) directed to an automated assistant, which may in some cases be converted into text and then processed, and/or by providing textual (e.g., typed) natural language input directed to an automated assistant. These spoken utterances and/or typed inputs often include assistant commands directed to an automated assistant. An automated assistant generally responds to these assistant commands by providing responsive user interface output(s) (e.g., audible and/or visual user interface output), controlling smart device(s), and/or performing other action(s).

These automated assistants typically rely upon a pipeline of components in interpreting and responding to these spoken utterances and/or typed inputs. For example, an automatic speech recognition (ASR) engine can process audio data that correspond to a spoken utterance of a user to generate ASR output, such as a transcription (i.e., sequence of term(s) and/or other token(s)) of the spoken utterance. Further, a natural language understanding (NLU) engine can process the ASR output (or typed inputs) to generate NLU output, such as an intent of the user in providing the spoken utterance and optionally slot value(s) for parameter(s) associated with the intent. Moreover, a fulfillment engine can be used to process the NLU output, and to obtain fulfillment output, such as the responsive user interface output(s), the responsive smart device control commands(s), and/or other responsive action(s).

In some cases, these automated assistants may fulfill certain spoken utterances in certain manners. For instance, assume that an automated assistant is executing at least in part at an in-vehicle computing device of a vehicle of a given user, and assume that the user directs a spoken utterance of "I'm cold" to the automated assistant. In this example, the given automated assistant can utilize the aforementioned pipeline of responding to the spoken utterance, resulting in implementation of a fulfillment action of turning the blower on in the vehicle to satisfy the spoken utterance. However, the given user that provided the spoken utterance may have desired only a heated seat of the vehicle to be turned on, but not the blower, which may differ from preferences of other users. As a result, the given user may have to manually turn off the blower and turn on the heated seat since the automated assistant implemented an incorrect fulfillment action and/or initiate an additional interaction with the automated assistant to cause a desired fulfillment action to be implemented. As a result, computational resources are wasted in these interactions based on the incorrect fulfillment action being implemented (and optionally any additional interaction resulting from the incorrect fulfillment action being implemented), and natural resources are wasted in this interaction based on turning on the blower when it was not a desired fulfillment action.

SUMMARY

Implementations described herein relate to dynamically adapting fulfillment of a given spoken utterance based on a user that provided the given spoken utterance, and optionally based on a contextual scenario in which the given spoken utterance is received. In some implementations, a system (e.g., including processor(s) and memory) can receive a given spoken utterance from a user, determine a set of fulfillment actions for the given spoken utterance, and determine whether the user that provided the given spoken utterance corresponds to a first user or a second user. Further, and in response to determining that the user corresponds to the first user, the system can select a subset of first fulfillment action(s) from the set, and cause the subset of first fulfillment action(s) to be implemented to satisfy the given spoken utterance. Moreover, and in response to determining that the user corresponds to the second user, the system can select a subset of distinct, second fulfillment action(s) from the set, and cause the subset of second fulfillment action(s) to be implemented to satisfy the given spoken utterance. Notably, the subset of second fulfillment action(s) may include at least one unique fulfillment action in comparison with the subset of first fulfillment action(s). Accordingly, fulfillment of the same spoken utterance provided by different users can be dynamically adapted based on whether the spoken utterance is provided by the first user or the second user.

For example, assume that the first user is driving a vehicle and provides a spoken utterance of "I'm hot", and assume that microphone(s) of an in-vehicle computing device of the vehicle generate audio data capturing the spoken utterance. In this example, the audio data capturing the spoken utterance can be processed using an automatic speech recognition (ASR) model to generate ASR data for the spoken utterance (e.g., recognized text of "I'm hot"). Further, the ASR data for the spoken utterance can be processed using a natural language understanding (NLU) model to generate NLU data for the spoken utterance (e.g., recognized intent(s) of "hot", "decrease temperature", or the like). Notably, the user that provided the spoken utterance can be determined to correspond to the first user using various audio-based (e.g., speaker identification (SID) and/or other audio-based techniques) and/or non-audio-based techniques (e.g., face identification (FID), user account identification, device identifier identification, and/or other non-audio-based techniques) described herein.

In some implementations, the NLU data for the spoken utterance can be processed to determine the set of fulfillment actions that, when implemented, are in furtherance of decreasing a temperature inside the vehicle. The set of fulfillment actions can include, for example, rolling down window(s) of the vehicle (if the windows of the vehicle are in a state indicating that they are rolled up) to decrease a temperature inside the vehicle, turning on a blower of the vehicle to circulate cold air throughout the vehicle to decrease a temperature inside the vehicle, and/or other fulfillment actions that can be performed to decrease a temperature inside the vehicle. In this example, the set of fulfillment actions can be processed, using a fulfillment action model and/or fulfillment rule(s) (e.g., personalized mapping(s)) that are specific to the first user, to select the first fulfillment action(s) to be implemented to satisfy the spoken utterance. For example, the first fulfillment action(s)) can include rolling down the window(s) of the vehicle, but not turning on the blower of the vehicle to circulate cold air throughout the vehicle.

In contrast, assume that the second user is driving the same vehicle at a subsequent time instance, and provides the same spoken utterance of "I'm hot". The spoken utterance can be processed in the same or similar manner to determine the set of fulfillment actions. However, in this example, the set of fulfillment actions can be processed, using a fulfillment action model and/or fulfillment rule(s) that are specific to the second user (e.g., and not the first user), to select the second fulfillment action(s) to be implemented to satisfy the spoken utterance. For example, the second fulfillment action(s) can include rolling down the window(s) of the vehicle and turning on the blower of the vehicle to circulate cold air throughout the vehicle.

In various implementations, the system may generate corresponding training instances that can be subsequently utilized in training the fulfillment action model(s) described above and/or the fulfillment rule(s) described above. These corresponding training instances may be specific to the different users and generated based on corresponding user interactions of the different users with various smart devices that are performed in different contextual scenarios. For example, assume that the first user, while in the vehicle, causes the window(s) of the vehicle to be rolled down at a given time instance of a plurality of time instances. Further assume that an ambient temperature sensor of the vehicle indicates a temperature inside the vehicle is 80 degrees Fahrenheit (e.g., a contextual signal that characterizes a state of the vehicular environment), which represents a "hot" contextual scenario, at the given time instance. In this example, a given training instance can be generated based on fulfillment action(s) manually performed by the user in this "hot" contextual scenario. The given training instance can include training instance output and training instance input. In this example, the training instance input can include the set of fulfillment actions capable of being performed to decrease the temperature inside the vehicle, and the contextual scenario (or an indication thereof) in which the fulfillment action was performed (e.g., the "hot" contextual scenario). Further, the training instance output can include the fulfillment action of the user interaction (or an indication thereof) performed by the user (e.g., rolling down the window(s) of the vehicle). This process can be repeated for a plurality of users in a plurality of different contextual scenarios to generate the corresponding training instances. In some of these implementations, the system can assign one or more voice commands to each of the different contextual scenarios (e.g., corresponding to a semantic term or phrase of the contextual scenario, such as "hot", "scorching", "burning", or the like in the above example).

In some versions of those implementations, the system may train the fulfillment action model(s) based on the corresponding training instances. For example, the system can process, using the fulfillment action model for the first user, the training instance input corresponding to the set of fulfillment actions capable of being performed to decrease the temperature inside the vehicle and the contextual scenario in which the fulfillment action was performed to generate predicted output. The predicted output can correspond to a subset of predicted first fulfillment action(s) that the first user is predicted to perform given the available fulfillment actions in the "hot" contextual scenario. Further, the predicted output can be compared to the fulfillment action of the user interaction performed by the user to generate one or more losses (e.g., across a distribution of the action(s)). Moreover, the fulfillment action model for the first user can be updated based on the one or more losses (e.g., via backpropagation). In these implementations, the system may only train the fulfillment action model(s) in response to determining one or more training conditions described herein are satisfied.

In various implementations, the system may generate corresponding personalized mapping(s) (e.g., fulfillment rule(s)) that are utilized in addition to, or in lieu of, the fulfillment action model(s) described above. For example, the system can generate the personalized mapping based on the one or more past instances of the user causing performance of the one or more fulfillment actions corresponding to the user interaction in the contextual scenario and independent of providing any spoken utterances. Further, the system can determine that the contextual scenario is correlated to the one or more voice commands using various techniques. For instance, the system can map different contextual scenarios represented by different contextual signals that characterize the state of the user and/or that characterize the state of the environment when the one or more fulfillment actions are performed to different portions of a lower-dimensional space (e.g., an embedding space, a semantic space, etc.). Further, the one or more voice commands can be assigned to the different contextual scenarios in the lower-dimensional space. Accordingly, when a given voice command is subsequently included in a given spoken utterance received from the user, the system can determine a given contextual scenario associated with the given voice command in the lower-dimensional space, and cause one or more given fulfillment actions that were previously performed in the given contextual scenario to be implemented to satisfy the given spoken utterance. Also, for instance, the system can map different contextual scenarios represented by different contextual signals that characterize the state of the user and/or that characterize the state of the environment when the one or more fulfillment actions are performed to different intents. Further, the one or more voice commands can be assigned to the different intents. Accordingly, when a given voice command is subsequently included in a given spoken utterance received from the user, the system can determine a given contextual scenario associated with the given voice command determined based on a given intent, and cause one or more given fulfillment actions that were previously performed in the given contextual scenario to be implemented to satisfy the given spoken utterance.

In some versions of those implementations, the system may only generate the personalized mapping in response to determining that the one or more fulfillment actions were performed by the user in the contextual scenario a threshold quantity of instances (e.g., one time, three times, five times, and/or any other positive integer of one or greater than one). For example, assume that there have been three past instances of the user rolling down the window(s) of the vehicle without turning on the blower of the vehicle, when an ambient temperature inside the vehicle is between 70 degrees Fahrenheit and 80 degrees Fahrenheit, and that the three past instances satisfies the threshold quantity of instances. In this example, the system can map the contextual scenario (e.g., the ambient temperature inside the vehicle being between 70 degrees Fahrenheit and 80 degrees Fahrenheit) to a first portion of a lower-dimensional space and/or associated with a "hot" intent, and assigns voice commands of "hot", "scorching", or the like to the first portion of the lower-dimensional space and/or associated with the "hot" intent. Accordingly, even if the user did not provide any spoken utterances during the three past instances, when the user subsequently provides a spoken utterance of "I'm hot" when the ambient temperature inside the vehicle being between 70 degrees Fahrenheit and 80 degrees Fahrenheit, the system can utilize the personalize mapping to automatically roll down the window(s). The system may also consider an ambient temperature outside of the vehicle in these examples.

Notably, in these implementations, the same voice command may be mapped to different fulfillment actions. Continuing with the above example, further assume that there have been three past instances of the user rolling down the window(s) of the vehicle and turning on the blower of the vehicle, when an ambient temperature inside the vehicle is above 80 degrees Fahrenheit, and that the three past instances satisfies the threshold quantity of instances. In this example, the system can map the contextual scenario (e.g., the ambient temperature inside the vehicle being above 80 degrees Fahrenheit) to a disparate second portion of the lower-dimensional space and/or associated with the "hot" intent, and assigns voice commands of "hot", "scorching", or the like to the disparate second portion of the lower-dimensional space and/or associated with the "hot" intent. However, based on the different fulfillment actions performed by the user in these three instances (e.g., rolling down the window(s) of the vehicle and turning on the blower of the vehicle), these past instances may be mapped to the disparate second portion of the lower-dimensional space, but associated with the same "hot" intent due to the different fulfillment actions being performed in a slightly different, but similar, contextual scenarios (e.g., when the ambient temperature inside the vehicle is above 80 degrees Fahrenheit rather than between 70 and 80 degrees Fahrenheit). Accordingly, even if the user did not provide any spoken utterances during the three past instances, when the user subsequently provides a spoken utterance of "I'm hot" when the ambient temperature inside the vehicle above 80 degrees Fahrenheit, the system can utilize the personalize mapping to automatically roll down the window(s) and automatically turn on the blower.

Although the above examples are described with respect to the spoken utterances being received in a vehicular environment, it should be understood that is for the sake of example and is not meant to be limiting. For example, the techniques described herein can be utilized in any environment in which a given computing device is utilized by multiple users to cause fulfillment of spoken utterances to be implemented. For instance, the techniques described herein can be utilized in a home environment, a work environment, a school environment, a commercial environment (e.g., a hotel and/or other business), and/or any other environment. Further, it should be noted that the fulfillment actions that may be implemented to satisfy spoken utterances may vary from environment-to-environment. For instance, fulfillment actions that can be implemented in a home environment may include controlling various Internet-of-Things (IoT) devices and/or causing other devices to change states, whereas fulfillment actions that can be implemented in the vehicular environment described above may include controlling various components and/or systems of the vehicle.

Further, although the above examples are described with respect to determining whether the user that provided the spoken utterance is the first user or the second user, it should be understood that is also for the sake of example and is not meant to be limiting. For example, a quantity of users considered in determining the user that provided the spoken utterance may be based on a quantity of users that are associated with a computing device that receives the spoken utterance (e.g., the in-vehicle computing device in the above example). Moreover, if the user that provided the spoken utterance is determined to not correspond to any of the users that are associated with the computing device, the user may be considered a default user, or guest user, and default fulfillment model(s) and/or default fulfillment rule(s), (e.g., default mapping(s)) may be utilized to determine how to satisfy the spoken utterance.

Moreover, although the above examples are described with respect to the first user and the second user providing the same spoken utterance at different time instances and while each driving the vehicle, it should be understood that is for the sake of example and is not meant to be limiting. For example, various environments may be partitioned into multiple zones, and multiple users may be co-located in the environment, but in different zones. For instance, the vehicular environment may be partitioned into a "driver" zone, a "front passenger" zone, and so on, whereas a home environment may be partitioned into a "living room" zone", a "kitchen" zone, and so on. In these instances, the fulfillment actions may be limited to the particular zones occupied by the user that provided the spoken utterance. For instance, assume the first user is driving the vehicle while the second user is a passenger of the vehicle. In this instance, when the first user provides the spoken utterance of "I'm hot", only the "driver" zone window may be rolled down; and when the second user provides the spoken utterance of "I'm hot", only the blower associated with the "front passenger" zone may be turned on. In other instances, no windows may be rolled down, and only the blower in both the "driver" zone and the "front passenger" zone may be turned on since the blower may be considered the more conservative fulfillment action (e.g., the second user may not like the windows rolled down, whereas the first user does not mind the blower). Additionally, or alternatively, joint fulfillment action model(s) and/or joint fulfillment rule(s) may be utilized in this type of scenario.

By using the techniques described herein, various technical advantages can be achieved. As one non-limiting example, techniques described herein enable a system to train fulfillment action model(s) and/or generate fulfillment rule(s) (e.g., personalized mapping(s)) of voice command(s) to fulfillment action(s) that are specific to respective users based on respective user interaction(s) performed in respective contextual scenario(s). These fulfillment action model(s) and/or fulfillment rule(s) can be subsequently utilized to personalize fulfillment of spoken utterances, such that different fulfillment action(s) can be implemented for different users based on receiving the same spoken utterance from the different users. As a result, a quantity of interactions and/or user inputs in cases where incorrect fulfillment is implemented may be reduced, thereby conserving computational resources at a computing device based on a reduced quantity of subsequent interactions to undo the incorrect fulfillment and/or to cause the correct fulfillment to be implemented. Further, a quantity of natural resources that are wasted in cases where incorrect fulfillment is implemented may be reduced.

The above description is provided as an overview of only some implementations disclosed herein. Those implementations, and other implementations, are described in additional detail herein.

DETAILED DESCRIPTION OF THE DRAWINGS

Figure 1:
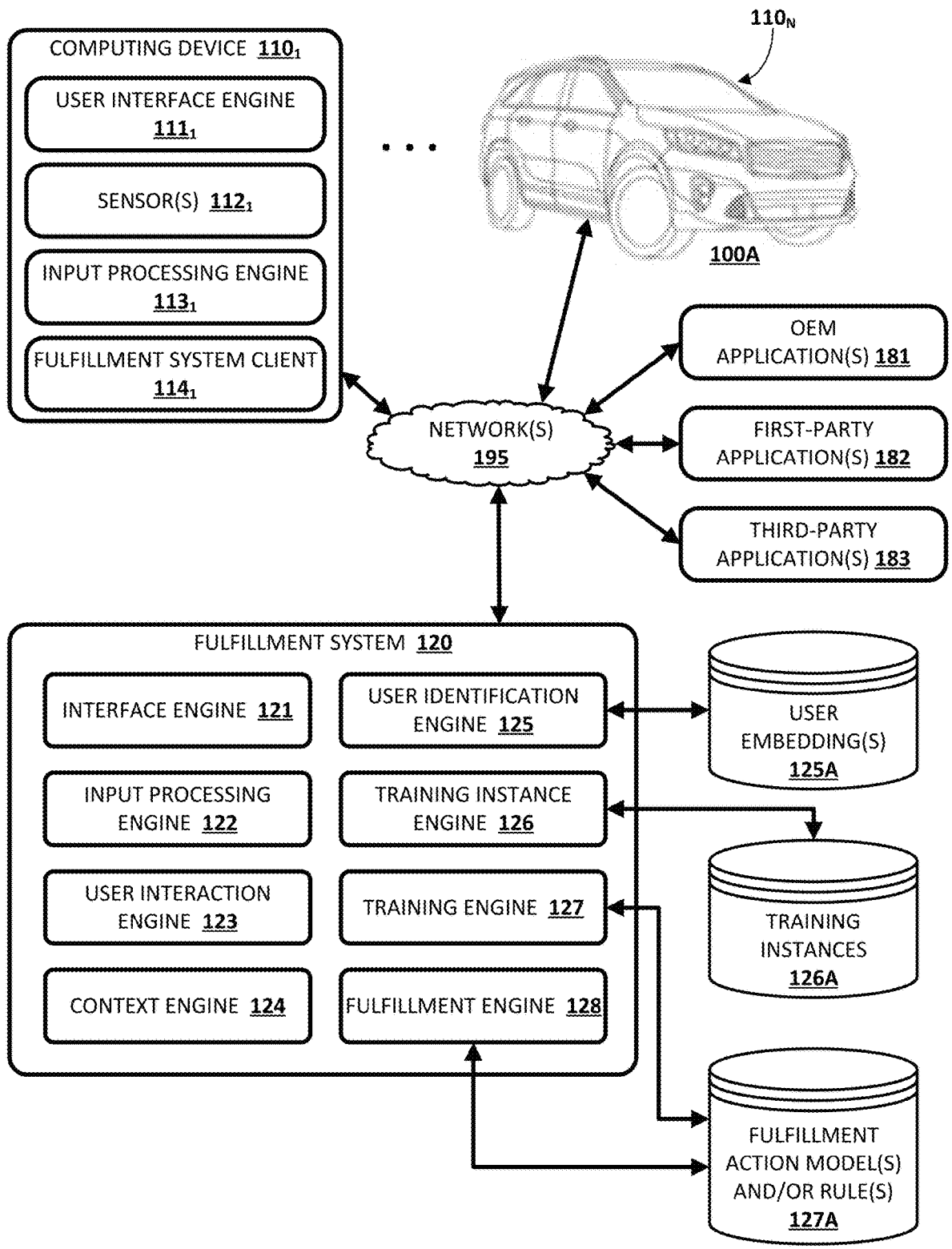
FIG. 1 depicts a block diagram of an example hardware and software environment that demonstrates various aspects of the present disclosure, and in which implementations disclosed herein can be implemented.

Turning now to FIG. 1, an environment in which one or more selected aspects of the present disclosure may be implemented is depicted. The example environment includes a plurality of computing devices $110_{1-N}$, a fulfillment system 120, a vehicle 100A, one or more original equipment manufacturer (OEM) applications 181, one or more first-party applications 182, and one or more third-party applications 183. Each of these components $110_{1-N}$, 120, 181, 182, and 183 may communicate, for example, through one or more networks indicated generally by 195. The one or more networks can include wired or wireless networks, such as local area networks (LANs) including Wi-Fi, Bluetooth, near-field communication, and/or other LANs, wide area networks (WANs) including the internet, and/or any other network to facilitate communication between the components depicted in FIG. 1.

In various implementations, a user may operate one or more of the computing devices $110_{1-N}$ to interact with other components depicted in FIG. 1. The computing devices $110_{1-N}$ may be, for example, a desktop computing device, a laptop computing device, a tablet computing device, a mobile phone computing device, a standalone speaker device optionally having a display, an in-vehicle computing device of the vehicle 100A (e.g., an in-vehicle communications system, an in-vehicle entertainment system, and/or an in-vehicle navigation system as shown with respect to $110_N$), or a wearable apparatus that includes a computing device, such as a head-mounted display ("HMD") that provides an augmented reality ("AR") or virtual reality ("VR") immersive computing experience, a "smart" watch, and so forth. Additional and/or alternative computing devices may be provided.

Each of the computing devices $110_{1-N}$ and the fulfillment system 120 may include one or more memories for storage of data and software applications (e.g., one or more of the OEM applications 181, one or more of the first-party applications 182, and/or one or more of the third-party applications 183), one or more processors for accessing data and executing the software applications, and other components that facilitate communication over one or more of the networks 195. The operations performed by one or more of the computing devices $110_{1-N}$ and/or the fulfillment system 120 may be distributed across multiple computer systems. For example, the fulfillment system 120 may be implemented as, for example, computer programs running exclusively on or distributed across one or more computers in one or more locations that are communicatively coupled to each other over one or more of the networks 195. Additionally, or alternatively, the operations performed by one or more of the computing devices $110_{1-N}$ and/or the fulfillment system 120 may be executed locally at a computing system. For example, the fulfillment system 120 (or an instance thereof) may be implemented locally at each of the computing devices $110_{1-N}$.

One or more of the components $110_{1-N}$, 120, 181, 182, and 183 may include a variety of different components that may be used, for instance, to dynamically adapt fulfillment of a given spoken utterance based on a user that provided the given spoken utterance as described herein. For example, a computing device $110_1$ may include user interface engine $111_1$ to detect and process user input (e.g., spoken utterances, typed input, and/or touch input) directed to the computing device $110_1$. As another example, the computing device $110_1$ may include one or more sensors $112_1$ to generate corresponding sensor data. The one or more sensors can include, for example, global positioning system ("GPS") sensors to generate GPS data, vision components to generate vision data in a field of view of the vision components, microphones to generate audio data based on spoken utterances captured in an environment of the computing device $110_1$, and/or other sensors to generate corresponding sensor data.

As yet another example, the computing device $110_1$ may operate an input processing engine $113_1$ (e.g., which may be standalone or part of another application, such as part of an automated assistant application) to process various user inputs received at the computing device $110_1$. For example, the input processing engine $113_1$ can cause audio data that captures a spoken utterance and that is generated by microphone(s) of the client device $110_1$ to be processed using automatic speech recognition (ASR) model(s) (e.g., a recurrent neural network (RNN) model, a transformer model, and/or any other ML model capable of performing ASR) to generate ASR output. Further, the input processing engine $113_1$ can cause the ASR output (or typed input) to be processed using natural language understanding (NLU) model(s) (e.g., a long short-term memory (LSTM), gated recurrent unit (GRU), and/or any other type of RNN or other ML model capable of performing NLU) and/or grammar-based NLU rule(s) to generate NLU output. Moreover, the input processing engine $113_1$ can cause at least the NLU output to be processed using fulfillment action model(s) and/or fulfillment rule(s) (e.g., personalized mapping(s)) to obtain one or more candidate responses that are responsive to the user input, such as action(s) to be performed by the automated assistant based on the user input, content item(s) to be provided for presentation to the user based on the user input, etc. These fulfillment action model(s) and/or fulfillment rule(s) can be stored in fulfillment action model(s) and/or rule(s) database 127A, and can be trained and subsequently utilized in the manner described herein. In implementations where textual content is to be audibly rendered responsive to the spoken utterance or typed input, the user interface engine $111_1$ can cause the textual content to be processed using text-to-speech model(s) to generate synthesized speech audio data that includes computer-generated synthesized speech capturing the content. The synthesized speech audio data can be audibly rendered for presentation to the user via speaker(s) of the computing device $110_1$. In implementations where visual content is to be visually rendered responsive to the spoken utterance or typed input, the user interface engine $111_1$ can cause the visual content to be to be visually rendered for presentation to the user via a display of the $110_1$.

In various implementations, the ASR output can include, for example, one or more speech hypotheses (e.g., term hypotheses and/or transcription hypotheses) that are predicted to correspond to the voice activity and/or the spoken utterance of the user captured in the audio data, one or more corresponding predicted values (e.g., probabilities, log likelihoods, and/or other values) for each of the one or more speech hypotheses, a plurality of phonemes that are predicted to correspond to the voice activity and/or the spoken utterance of the user captured in the audio data, and/or other ASR output. In some versions of those implementations, the input processing engine $113_1$ can cause one or more of speech hypotheses to be selected as recognized text that corresponds to the spoken utterance (e.g., based on the corresponding predicted values).

In various implementations, the NLU output can include, for example, annotated recognized text that includes one or more annotations of the recognized text for one or more (e.g., all) of the terms of the recognized text. For example, the input processing engine $113_1$ can cause a part of speech tagger (not depicted) that is configured to annotate terms with their grammatical roles to be employed. Additionally, or alternatively, the input processing engine $113_1$ can cause an entity tagger (not depicted) that is configured to annotate entity references in one or more segments of the recognized text to be employed. The entity references can include, for instance, references to people (including, for instance, literary characters, celebrities, public figures, etc.), organizations, locations (real and imaginary), and so forth. In some implementations, data about entities may be stored in one or more databases, such as in a knowledge graph (not depicted). In some implementations, the knowledge graph may include nodes that represent known entities (and in some cases, entity attributes), as well as edges that connect the nodes and represent relationships between the entities. The entity tagger may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

Additionally, or alternatively, the input processing engine $113_1$ can cause a coreference resolver (not depicted) that is configured to group, or "cluster," references to the same entity based on one or more contextual cues to be employed. As one non-limiting example, the coreference resolver may be utilized to resolve the term "that" to a particular light or indicator associated with operation of the vehicle 100A in the natural language input "what's that light?", based on a corresponding sensor data instance generated by vehicle sensor(s) that resulted in the particular light or indicator associated with operation of the vehicle 100A being generated. In some implementations, one or more components utilized by the input processing engine $113_1$ may rely on annotations from one or more other components utilized by the input processing engine $113_1$. For example, in some implementations the entity tagger may rely on annotations from the coreference resolver in annotating all mentions to a particular entity. Also, for example, in some implementations, the coreference resolver may rely on annotations from the entity tagger in clustering references to the same entity.

As yet another example, the computing device $110_1$ may operate a fulfillment system client $114_1$ (e.g., which may be standalone or part of another application, such as part of an automated assistant application) to interact with the fulfillment system 120. Further, an additional computing device $110_N$ may take the form of an in-vehicle computing device of the vehicle 100A. Although not depicted, the additional computing device $110_N$ may include the same or similar components as the computing device $110_1$. For example, the additional computing device $110_N$ may include respective instances of a user interface engine to detect and process user input, one or more sensors to generate corresponding vehicle sensor data instances of vehicle sensor data, an input processing engine, and/or a fulfillment system client to interact with the fulfillment system 120. In this example, the one or more sensors can include vehicle sensors, such as tire pressure sensors to generate tire pressure data for tires of the vehicle 100A, airflow sensors to generate airflow data for an air conditioning system of the vehicle 100A, vehicle speed sensors to generate vehicle speed data for the vehicle 100A, energy sensors to generate energy source data for an energy source of the vehicle 100A, transmission sensors to generate transmission data for a transmission of the vehicle 100A, and/or any other sensors that are integral to the vehicle 100A and/or the in-vehicle computing device $110_N$ of the vehicle 100A. Moreover, although only the computing device $110_1$ and the in-vehicle computing device $110_N$ are depicted in FIG. 1, it should be understood that is for the sake of example and additional or alternative computing devices may be provided (e.g., as described with respect to FIGS. 6A and 6B).

In various implementations, the fulfillment system 120 may include interface engine 121, input processing engine 122, user interaction engine 123, context engine 124, user identification engine 125, training instance engine 126, training engine 127, and fulfillment engine 128 as shown in FIG. 1. In some implementations, one or more of the engines 121-128 of the fulfillment system 120 may be omitted. In some implementations, all or aspects of one or more of the engines 121-128 of the fulfillment system 120 may be combined. In some implementations, one or more of the engines 121-128 of the fulfillment system 120 may be implemented in a component that is executed, in part or exclusively, remotely from one or more of the computing devices $110_{1-N}$. In some implementations, one or more of the engines 121-128 of the fulfillment system 120, or any operative portion thereof, may be implemented in a component that is executed, in part or exclusively, locally by one or more of the computing devices $110_{1-N}$.

Figure 2:
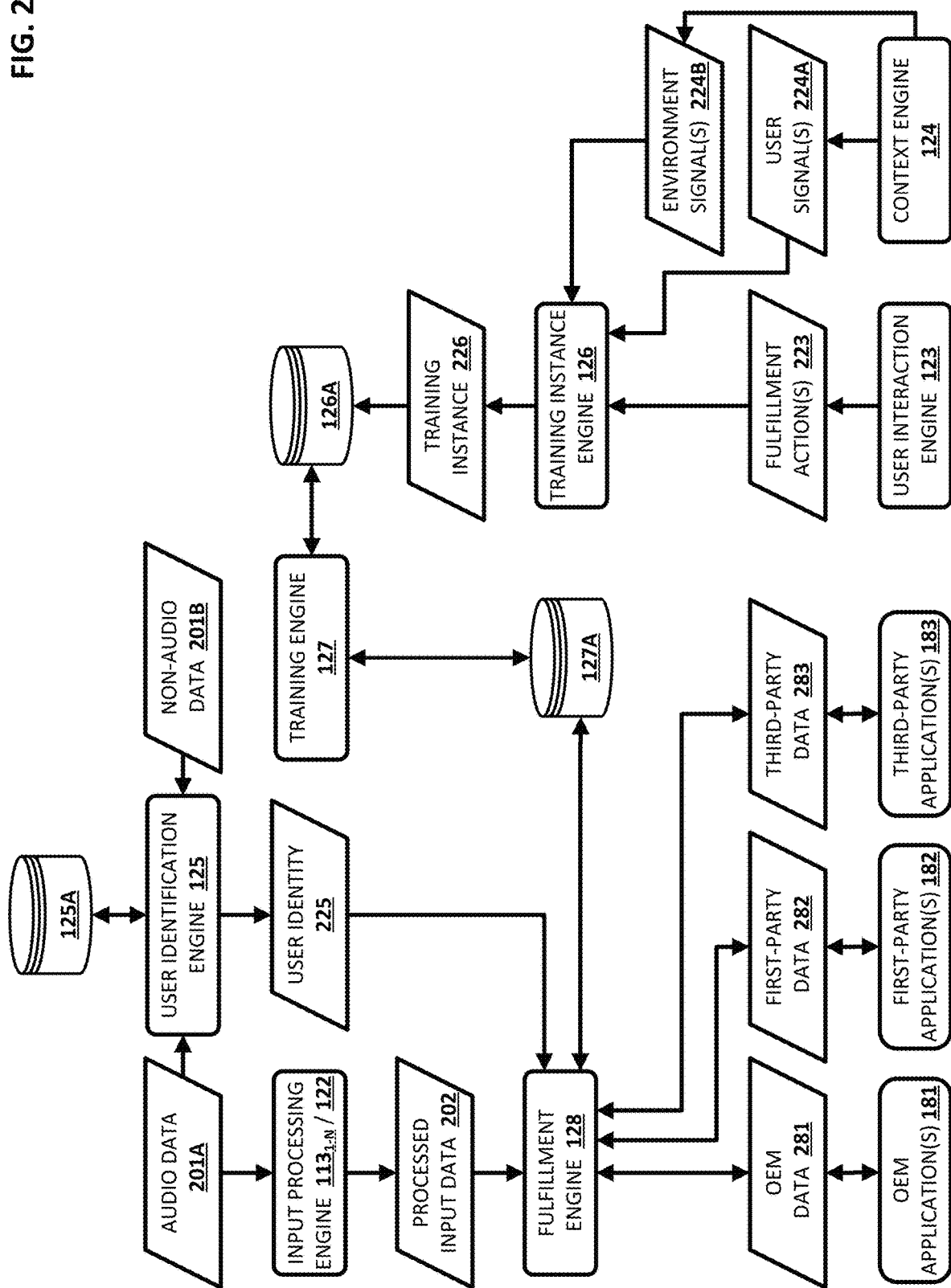
FIG. 2 depicts an example process flow of the example hardware and software environment of FIG. 1, in accordance with various implementations.

Referring to FIG. 2, an example process flow of the example hardware and software environment of FIG. 1 is depicted. For the sake of example, assume audio data 201A capturing a spoken utterance of a user is received at the fulfillment system 120. The input processing engine $113_{1-N}/122$ can process the audio data to generate processed input data 202. For example, the input processing engine $113_{1-N}/122$ can process, using an ASR model, the audio data 201A to generate ASR data for the spoken utterance captured in the audio data 201A. Further, the input processing engine $113_{1-N}/122$ can process, using an NLU model, the ASR data for the spoken utterance captured in the audio data 201A to generate NLU data for the spoken utterance captured in the audio data 201A. Moreover, the input processing engine $113_{1-N}$/122 can provide the audio data 201A, the ASR data for the spoken utterance captured in the audio data 201A, and/or the NLU data for the for the spoken utterance captured in the audio data 201A to the fulfillment engine as the processed input data 202.

Further, the user identification engine 125 can process the audio data 201A and/or non-audio data 201B (e.g., vision data capturing the user that provided the spoken utterance, user profile data of a user profile of the user that provided the spoken utterance, device identifier data of a computing device of the user that received the spoken utterance, etc.) to determine a user identity 225 of the user that provided the spoken utterance. As described in more detail with respect to FIG. 3, the user identification engine can utilize audio-based identification techniques to determine the user identity 225 (e.g., text dependent (TD) speaker identification (SID), text independent (TI) SID), and/or non-audio-based identification techniques to determine the user identity 225 (e.g., face identification (FID), user profile identification, device identifier identification, etc.). Notably, in determining the user identity 225, the user identification engine 125 can utilize various user embeddings (e.g., stored in the user embedding(s) database 125A). These various user embeddings can include TD speaker embeddings, TI speaker embeddings, face embeddings, and/or other embeddings. Generating and utilizing these embeddings in determining the user identity 225 is described in more detail herein (e.g., with respect to FIG. 3). Moreover, the user identification engine 125 can provide the user identity to the fulfillment engine 128.

Moreover, the fulfillment engine 128 can process at least the processed input data 202 and the user identity 225 to determine one or more fulfillment actions to be implemented in response to receiving the spoken utterance. In some implementations, the fulfillment engine 128 can process at least the processed input data 202 and the user identity 225 to determine a set of fulfillment actions. For example, the fulfillment engine 128 can generate one or more structured requests, and transmit one or more of the structured requests to various applications to obtain fulfillment actions included in the set. For instance, the fulfillment engine 128 can generate one or more structured requests, and transmit one or more of the structured requests to one or more OEM applications 181 (e.g., in implementations where the user is located in the vehicle 100A), one or more first-party applications 182, and/or one or more third-party applications 183. As used herein, the term "first-party application" may refer to a software application that is developed and/or maintained by the same entity that develops and/or maintains the fulfillment system 120 described herein. Further, as used herein, the term "third-party application" may refer to a software application or system that is developed and/or maintained by an entity that is different from the entity that develops and/or maintains the fulfillment system 120 described herein. Responsive to the one or more structured requests, the one or more OEM applications 181 can transmit OEM data 281 to the fulfillment engine 128, the one or more first-party applications 182 can transmit first-party data 282 to the fulfillment engine 128, and/or the one or more third-party applications 183 can transmit third-party data 283 to the fulfillment engine 128. Based on the OEM data 281, the first-party data 282, and/or the third-party data 283, the fulfillment engine 128 can determine the set of fulfillment actions.

In these implementations, the fulfillment engine 128 can further process the set of fulfillment actions to determine one or more fulfillment actions to be implemented in response to receiving the spoken utterance. The fulfillment engine 128 can optionally further process contextual signals obtained via the context engine 124 (e.g., user signal(s) that characterize a state of the user and/or environmental signal(s) that characterize a state of the environment of the user). For example, the fulfillment engine 128 can process, using a fulfillment action model and/or fulfillment rule(s) (e.g., stored in the fulfillment action model(s) and/or rule(s) database 127A) that is specific to the user that provided the spoken utterance as indicated by the user identity 225, the one or more fulfillment actions to be implemented in response to receiving the spoken utterance from the set of fulfillment actions, and optionally the contextual signals. Further, the fulfillment engine 128 can cause the one or more fulfillment actions to be implemented in response to receiving the spoken utterance to satisfy the spoken utterance. Put another way, in these implementations, the fulfillment system 120 can initially determine a set of fulfillment actions using conventional techniques. However, the fulfillment system 120 can subsequently process the set of fulfillment actions to select the one or more fulfillment actions using the fulfillment action model and/or fulfillment rule(s) that is specific to the user that provided the spoken utterance as indicated by the user identity 225. This enables the fulfillment system 120 to personalize fulfillment of the spoken utterance to the user that provided the spoken utterance as indicated by the user identity 225.

Notably, the fulfillment action model that is specific to the user that provided the spoken utterance as indicated by the user identity 225 may be previously trained and/or the fulfillment rule(s) that are specific to the user that provided the spoken utterance as indicated by the user identity 225 may be previously generated. For example, prior to receiving the spoken utterance captured in the audio data 201A, the user interaction engine 123 can identify, at a given time instance of a plurality of time instances, a user interaction of the user with one or more smart devices. The user interaction can correspond to one or more fulfillment actions 223. In various implementations, the one or more fulfillment actions 223 of the user interaction may be limited to those that cause one or more of the smart devices to change states in some manner. The user interaction engine 123 can provide the one or more fulfillment actions 223 to the training instance engine 126.

Further, the context engine 124 can obtain, at the given time instance of the user interaction, one or more contextual signals that characterize a state of the user as indicated by user signal(s) 224A and/or that characterize a state of an environment of the user as indicated by environment signal(s) 224B. The user signal(s) 224A and/or the environment signal(s) 224B can be utilized to define a contextual scenario, and the contextual scenario can be subsequently utilized in biasing interpretations of subsequent spoken utterances that are received in the contextual scenario. The context engine 124 can provide the user signal(s) 224A and the environment signal(s) 224B to the training instance engine 126. These contextual signal(s) and contextual scenarios are described in more detail herein (e.g., with respect to FIG. 4). As noted above, at inference, the context engine 124 can provide contextual signals to the fulfillment engine 128.

The training instance engine 126 can process one or more fulfillment actions 223 corresponding to the user interaction, and the user signal(s) 224A and/or the environment signal(s) 224B to generate a training instance 226. Further, the training instance engine 126 can store the training instance 226 in training instance(s) database 126A. Moreover, the training engine 127 can, based on the training instance 226 and optionally one or more additional training instances generated in the same or similar manner, train the fulfillment action model that is specific to the user that provided the spoken utterance and/or generate one or more fulfillment rules that are specific to the user that provided the spoken utterance. Training the fulfillment action model that is specific to the user that provided the spoken utterance and/or generating one or more fulfillment rules that are specific to the user that provided the spoken utterance is described in more detail herein (e.g., with respect to FIG. 4).

Figure 3:
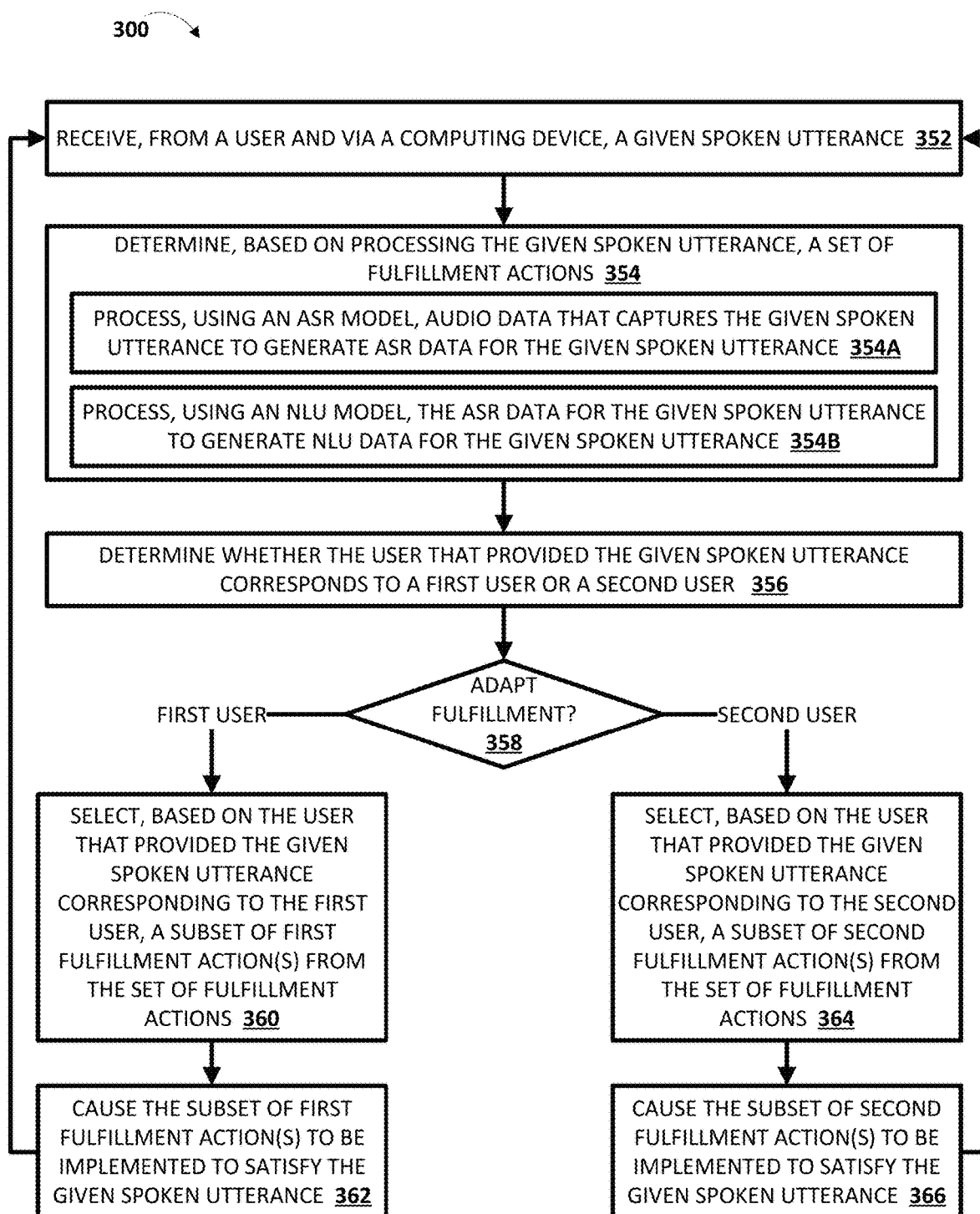
FIG. 3 depicts a flowchart illustrating an example method of dynamically adapting fulfillment of a given spoken utterance based on a user that provided the given spoken utterance, in accordance with various implementations.

Turning now to FIG. 3, a flowchart illustrating an example method 300 of dynamically adapting fulfillment of a given spoken utterance based on a user that provided the given spoken utterance is depicted. For convenience, the operations of the method 300 are described with reference to a system that performs the operations. This system of the method 300 includes at least one processor, at least one memory, and/or other component(s) of computing device(s) (e.g., computing device(s) $110_{1-N}$ of FIGS. 1, 5A, 5B, 6A, and 6B, fulfillment system 120 of FIG. 1, computing device 710 of FIG. 7, remote server(s), and/or other computing devices). While operations of the method 300 are shown in a particular order, this is not meant to be limiting. One or more operations may be reordered, omitted, and/or added.

At block 352, the system receives, from a user and via a computing device, a given spoken utterance. For example, the user can provide the given spoken utterance to an in-vehicle computing device while the user is located in a vehicle of the user, and the given spoken utterance can be captured in audio data generate via microphone(s) of the in-vehicle computing device (e.g., as described with respect to FIGS. 5A and 5B). Also, for example, the user can provide the given spoken utterance to a mobile computing device or a standalone computing device while the user is located in a primary dwelling of the user, and the given spoken utterance can be captured in audio data generate via microphone(s) of the mobile computing device or the standalone computing device (e.g., as described with respect to FIGS. 6A and 6B).

At block 354, the system determines, based on processing the given spoken utterance, a set of fulfillment actions. Each fulfillment action included in the set of fulfillment actions, when implemented, being in furtherance of satisfying the given spoken utterance. For example, and as indicated at block 354A, the system may process, using an ASR model, audio data that captures the given spoken utterance to generate ASR data for the given spoken utterance. Further, and as indicated at block 354B, the system may process, using an NLU model, the ASR data for the given spoken utterance to generate NLU data for the given spoken utterance. For instance, assume the given spoken utterance provided by the user corresponds to "I'm cold". In this instance, the system may process audio data capturing the spoken utterance to generate recognized text of "I'm cold" as the ASR data for the given spoken utterance. Further, the system may process the recognized text of "I'm cold" to identify one or more intents for the given spoken utterance, such as an intent of "cold", "increase heat", or the like. Moreover, the system may determine the set of fulfillment actions based on at least one or more intents. In this instance, and assuming that the given spoken utterance is received in a vehicular environment, the set of fulfillment actions can include, for example, rolling up window(s) of the vehicle, turning on heated seats of the vehicle, turning on a blower of the vehicle, and/or any other actions that may be implemented to increase a temperature inside the vehicle. In contrast, and assuming that the given spoken utterance is received in a home environment, the set of fulfillment actions can include, for example, increasing a thermostat temperature of a primary dwelling corresponding to the home environment to a first temperature, increasing the thermostat temperature of the primary dwelling to a second temperature, and/or any other actions that may be implemented to increase a temperature inside the primary dwelling.

At block 356, the system determines whether the user that provided the given spoken utterance corresponds to a first user or a second user. The system may utilize various techniques for determining whether the user that provided the given spoken utterance corresponds to a first user or a second user. In some implementations, the system may cause speaker identification (SID) to be performed to determine whether the user that provided the given spoken utterance corresponds to the first user or the second user. For example, the system may process, using SID model(s) the audio data that captures the given spoken utterance to generate a speaker embedding for the user that provided the given spoken utterance. The generated speaker embedding can be compared, in embedding space, with one or more previously generated speaker embeddings for one or more users of the computing device (e.g., an embedding associated with a user profile of the one or more users). For example, if a distance metric, determined based on the comparing in the embedding space, between the generated speaker embedding and a given one of the one or more previously generated speaker embeddings for the one or more users satisfies a threshold, the user can be determined to correspond to the user associated with the given one of the one or more previously generated speaker embeddings. Otherwise, the user may be identified as a guest user.

In these implementations, the one or more previously generated speaker embeddings for the one or more users can be generated based on output(s) generated based on processing of one or more instances of audio data that includes spoken utterances that are from the one or more users, respectively. For example, the one or more previously generated speaker embeddings can be based on an average (or other combination) of a plurality of different embeddings that are each generated based on processing of a corresponding instance of audio data that includes a corresponding spoken utterance from the one or more users, respectively. Further, in these implementations, the SID model can be a text independent (TI) SID model, a text dependent (TD) SID model, and/or any other suitable SID model.

For instance, in TD SID, the one or more previously generated speaker embeddings of the one or more users are generated based on spoken utterances that include only one or more particular words or phrases. Moreover, in use, the one or more users may be required to speak the one or more particular words or phrases for one or more TD SID speaker embedding to be generated using the TD SID model, which can be effectively compared to one or more previously generated TD speaker embeddings for the one or more users to determine whether the user that provided the given spoken utterance corresponds to the first user or the second user. For example, the one or more particular words or phrases in TD speaker recognition can be constrained to one or more invocation phrases configured to invoke the automated assistant (e.g., hot words and/or trigger words such as, for example, "Hey Assistant", "OK Assistant", and/or "Assistant") or one or more other words or phrases. In contrast, in TI SID, the spoken utterances processed using the TI SID model is not constrained to the one or more particular words or phrases. In other words, audio data based on virtually any spoken utterances can be processed using the TI SID model to generate a TI SID speaker embedding, which can be effectively compared to one or more previously generated TI speaker embeddings for the one or more users to determine whether the user that provided the given spoken utterance corresponds to the first user or the second user. Moreover, in various implementations, the one or more previously generated TI speaker embeddings of the one or more users utilized in TI SID are generated based on spoken utterances that include disparate words and/or phrases and are not limited to invocation words and/or phrases, and/or any other particular spoken utterances.

In additional or alternative implementations, the system may cause other forms of identification to be performed to determine whether the user that provided the given spoken utterance corresponds to the first user or the second user. For example, the system may perform facial identification, fingerprint identification, and/or other types of biometric identification. For instance, vision components of the client device can capture vision data that includes a face of the user that provided the spoken utterance. In this instance, the system may process, using a face identification (FID) model, the vision data to generate a facial embedding of the user that provided the spoken utterance. The facial embedding of the user that provided the spoken utterance can correspond to an embedding that can be compared, in embedding space, to one or more previously generated embeddings corresponding to a facial embedding of the one or more users of the computing device to determine whether the user that provided the given spoken utterance corresponds to the first user or the second user. Also, for instance, a fingerprint sensor can receive touch input of the user that provided the given spoken utterance, and compare the detected fingerprint with known fingerprints of the one or more users of the computing device to determine whether the user that provided the given spoken utterance corresponds to the first user or the second user. Also, for instance, a display interface of the client device can receive touch input of the user corresponding to a particular password of the client device to determine whether the user that provided the given spoken utterance corresponds to the first user or the second user. As another example, the system can utilize device identifiers and/or user accounts associated with the computing device and/or an additional computing device in communication with the computing device to determine whether the user that provided the given spoken utterance corresponds to the first user or the second user based on inferring the user from the device identifiers and/or the user accounts.

At block 358, the system determines how to dynamically adapt fulfillment of the given spoken utterance based on determining whether the user that provided the given spoken utterance corresponds to the first user or the second user from block 356. For example, if at an iteration of block 358, the system determines that the user that provided the given spoken utterance corresponds to a first user, the system can proceed to block 360. At block 360, the system selects, based on the user that provided the given spoken utterance corresponding to the first user, a subset of one or more first fulfillment actions from the set of fulfillment actions from block 354. In some implementations, the system can select the subset of one or more first fulfillment actions based on contextual signals that characterizes a state of the user and/or a state of the environment of the user. At block 362, the system causes the subset of the one or more first fulfillment actions to be implemented to satisfy the given spoken utterance. The system can select the subset of the one or more first fulfillment actions from the set of fulfillment actions using a fulfillment action model and/or fulfillment rule(s) (e.g., personalized mapping(s)) that are specific to the first user. For example, the system can process, using the fulfillment action model and/or the fulfillment rule(s) that are specific to the first user, the NLU data for the given spoken utterance and/or the set of fulfillment actions from block 354, and optionally contextual signals that characterize a state of the user that provided the given spoken utterance and/or a state of an environment in which the user is located when the given spoken utterance is provided, to select the one or more first fulfillment actions for inclusion in the subset. Generating and utilizing fulfillment action model(s) and/or fulfillment rule(s) (e.g., personalized mapping(s)) that are specific to a given user is described in more detail with respect to FIG. 4.

However, if at an iteration of block 358, the system determines that the user that provided the given spoken utterance corresponds to a second user, the system can proceed to block 364. At block 364, the system selects, based on the user that provided the given spoken utterance corresponding to the second user, a subset of one or more second fulfillment actions from the set of fulfillment actions from block 354. At block 366, the system causes the subset of the one or more second fulfillment actions to be implemented to satisfy the given spoken utterance. Similarly, the system can select the subset of the one or more second fulfillment actions from the set of fulfillment actions using a fulfillment action model and/or fulfillment rule(s), but that are specific to the second user. For example, the system can process, using the fulfillment action model and/or the fulfillment rule(s) that are specific to the second user, the NLU data for the given spoken utterance and/or the set of fulfillment actions from block 354, and optionally contextual signals that characterize a state of the user that provided the given spoken utterance and/or a state of an environment in which the user is located when the given spoken utterance is provided, to select the one or more second fulfillment actions for inclusion in the subset. As noted above, generating and utilizing fulfillment action model(s) and/or fulfillment rule(s) that are specific to a given user is described in more detail with respect to FIG. 4. Notably, the subset of the one or more second fulfillment actions may include at least one unique fulfillment action, from the set of fulfillment actions, as compared to the subset of the one or more first fulfillment actions. Put another way, fulfillment of the same spoken utterance may differ depending on the user that provided the spoken utterance.

Continuing with the above example where the given spoken utterance provided by the user corresponds to "I'm cold", further assume that that the given spoken utterance was provided by the first user. In this example, and assuming that the given spoken utterance was provided in a vehicular environment, then a fulfillment action associated with turning on a heated seat of the first user may be selected and implemented since the fulfillment action model and/or fulfillment rule(s) that are specific to the first user may have learned that the first user typically only turns on the heated seat of the vehicle and without turning on the blower when cold. Moreover, and assuming that the system has access to various environmental signals that characterize a state of the vehicle and that the environmental signals indicate that windows of the vehicle are rolled down when the spoken utterance is received, then a fulfillment action associated with rolling up the windows may be selected and implemented since the fulfillment action model and/or fulfillment rule(s) that are specific to the first user may have learned that the first user also typically rolls up the windows when they are cold if the windows are rolled down. Also, in this example, and assuming that the given spoken utterance was provided in a home environment, then a fulfillment action associated with turning up a thermostat temperature by N degrees (e.g., where N is a positive integer) or turning up the thermostat temperature to a first particular temperature (e.g., 74 degrees) may be selected and implemented since the fulfillment action model and/or fulfillment rule(s) that are specific to the first user may have learned that this the first user typically utilizes the thermostat in this manner when cold.

In contrast, further assume that the given spoken utterance was provided by the second user. In this example, and assuming that the given spoken utterance was provided in a vehicular environment, then a fulfillment action associated with turning on a heated seat of the second user and turning on a blower may be selected and implemented since the fulfillment action model and/or fulfillment rule(s) that are specific to the second user may have learned that this the second user typically only turns on both the heated seat of the vehicle and the blower when cold. Also, in this example, and assuming that the given spoken utterance was provided in a home environment, then a fulfillment action associated with turning up a thermostat temperature by M degrees (e.g., where M is a positive integer that differs from N) or turning up the thermostat temperature to a second particular temperature (e.g., 75 degrees) may be selected and implemented since the fulfillment action model and/or fulfillment rule(s) that are specific to the second user may have learned that this the second user typically utilizes the thermostat in this manner when cold.

From blocks 362 and 366, the system returns to block 352 to perform additional iterations of the method 300 of FIG. 3 based on additional given spoken utterances that are received via the computing device. Accordingly, when different users provide the same spoken utterance (e.g., "I'm cold" in the above example), the system can dynamically adapt fulfillment of that same spoken utterance based on how different users typically cause different actions to be performed in the same or similar contextual scenario. As a result, fulfillment of the given spoken utterance is improved, thereby reducing a quantity of user interactions and/or a quantity of user inputs received to cause a desired fulfillment action to be performed in instances where an incorrect fulfillment action is initially performed since the fulfillment of the given spoken utterance may not be specific to the user that provided the given spoken utterance.

In various implementations, the system may cause an indication of why the one or more fulfillment actions were selected and implemented to satisfy the given spoken utterance for the corresponding users to be provided for audible and/or visual presentation to the corresponding users via the computing device. The indication of why the one or more fulfillment actions were selected and implemented to satisfy the given spoken utterance may be generated using the fulfillment action model(s) and/or the fulfillment rule(s). Continuing with the above example, and assuming that the given spoken utterance was provided in a vehicular environment by the first user, the indication of why the one or more fulfillment actions were selected and implemented to satisfy the given spoken utterance can correspond to "I turned on your heated seat, but not the blower, because that is what you typically do when you are cold in the car". Synthesized speech audio data including synthesized speech that captures the indication can be audibly rendered for presentation to the first user via speaker(s) of the computing device and/or textual data corresponding to the indication can be visually rendered for presentation to the first user via a display of the computing device. Notably, the indication of why the one or more fulfillment actions were selected and implemented to satisfy the given spoken utterance may only be provided for presentation a threshold quantity of times (e.g., at least one time) to educate the corresponding users, but avoid inundating and annoying the user with the same information.

In various implementations, the system may generate a prompt requesting that the user provide feedback with respect to the one or more fulfillment actions that were selected and implemented, and cause the prompt to be provided for presentation to the user. Based on user input received from the user responsive to the prompt, the system can cause the fulfillment action model(s) and/or the fulfillment rule(s) that are specific to the user to be updated. For example, the system can generate the above indication (e.g., "I turned on your heated seat, but not the blower, because that is what you typically do when you are cold in the car") and additionally, or alternatively, generate a prompt of "Is that correct?" In this example, if affirmative user input is received, then the system can generate a positive training instance to bias subsequent fulfillment of the same spoken utterance towards the selection and implementation of the one or more first fulfillment actions. However, if negative user input is received, then the system can generate a negative training instance to bias subsequent fulfillment of the same spoken utterance away from the selection and implementation of the one or more first fulfillment actions.

In additional or alternative implementations, the system may utilize one or more subsequent user interactions as feedback with respect to the one or more fulfillment actions that were selected and implemented. For example, if the system selects and implements a fulfillment action associated with turning on a heated seat of the first user based on the given spoken utterance "I'm cold" being provided by the first user, but the first user turns off the heated seat subsequent to implementation of the fulfillment action, then the system can generate a negative training instance to bias subsequent fulfillment of the same spoken utterance away from the selection and implementation of the one or more first fulfillment actions (e.g., the fulfillment action associated with turning on a heated seat of the first user). In contrast, if the system selects and implements a fulfillment action associated with turning on a heated seat of the first user based on the given spoken utterance "I'm cold" being provided by the first user, and the first user does not turn off the heated seat subsequent to implementation of the fulfillment action, then the system can generate a positive training instance to bias subsequent fulfillment of the same spoken utterance towards from the selection and implementation of the one or more first fulfillment actions (e.g., the fulfillment action associated with turning on a heated seat of the first user) based on inferring the fulfillment action was correctly implemented responsive to the given spoken utterance.

Although FIG. 3 is described herein with respect to particular utterances and particular fulfillment actions, it should be understood that is for the sake of example and is not meant to be limiting. Further, although FIG. 3 is described herein with respect to only a first user and a second user, it should be understood that is also for the sake of example and is not meant to be limiting. For instance, a quantity of users considered in determining the user that provided the given spoken utterance may be based on a quantity of users that are associated with the computing device. If the user that provided the given spoken utterance is not determined to correspond to any known users, then the user may be considered a default user and fulfillment action model(s) and/or the fulfillment rule(s) that are not specific to any user may be utilized in dynamically adapting fulfillment of the given spoken utterance.

Figure 4:
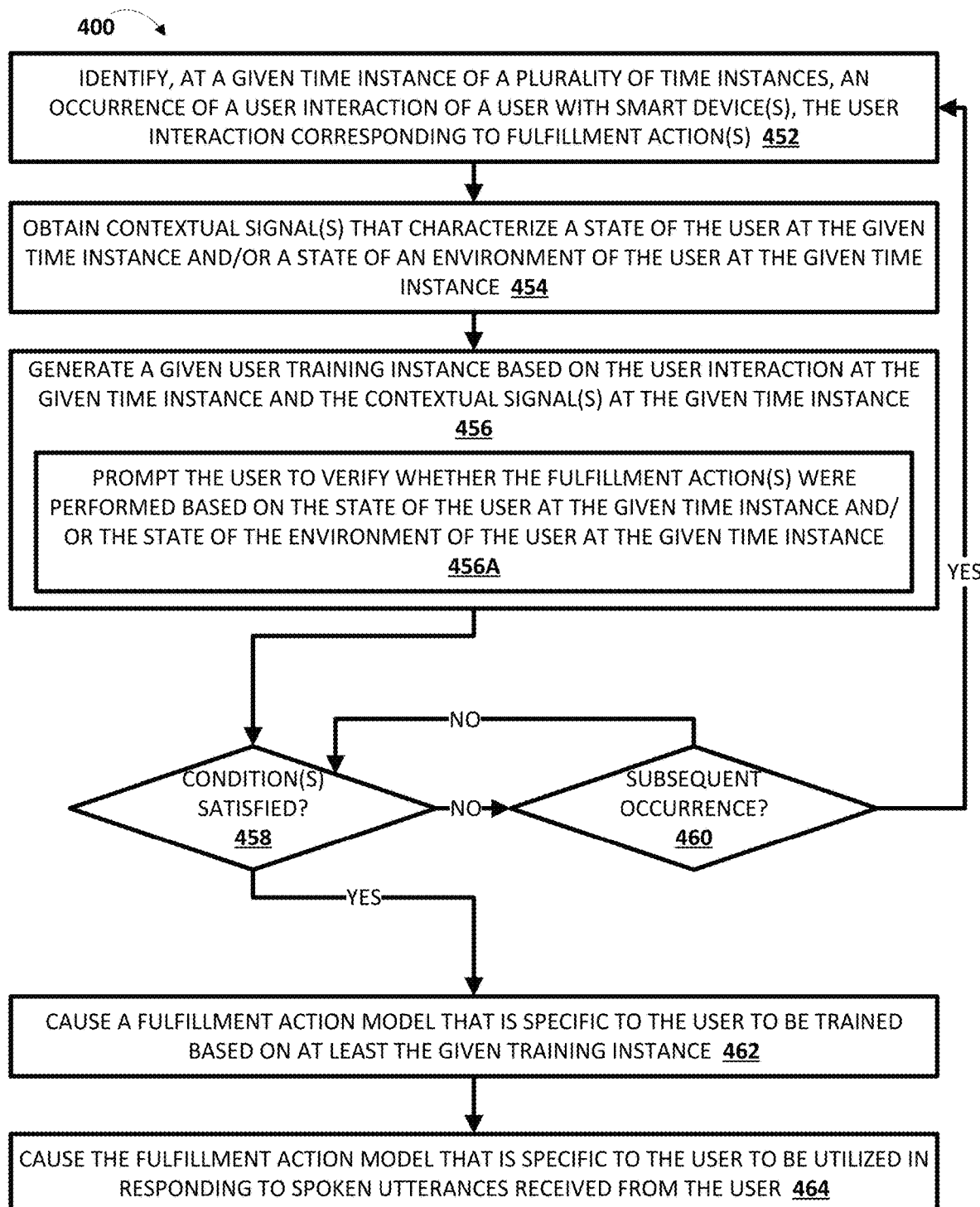
FIG. 4 depicts a flowchart illustrating an example method of generating training instance(s) for training a fulfillment action model that is specific to a user, and training the fulfillment action model for subsequent use in dynamically adapting fulfillment of a given spoken utterance provided by the user, in accordance with various implementations.

Turning now to FIG. 4, a flowchart illustrating an example method 400 of generating training instance(s) for training a fulfillment action model that is specific to a user, and training the fulfillment action model for subsequent use in dynamically adapting fulfillment of a given spoken utterance provided by the user is depicted. For convenience, the operations of the method 400 are described with reference to a system that performs the operations. This system of the method 400 includes at least one processor, at least one memory, and/or other component(s) of computing device(s) (e.g., computing device(s) $110_{1-N}$ of FIGS. 1, 5A, 5B, 6A, and 6B, fulfillment system 120 of FIG. 1, computing device 710 of FIG. 7, remote server(s), and/or other computing devices). While operations of the method 400 are shown in a particular order, this is not meant to be limiting. One or more operations may be reordered, omitted, and/or added.

At block 452, the system identifies, at a given time instance of a plurality of time instances, an occurrence of a user interaction of a user with one or more smart devices, the user interaction corresponding to one or more fulfillment actions. The system may be communicatively coupled to the one or more smart devices and consider any user interaction that causes a state of the one or more smart devices to change as an occurrence of a user interaction. Further, the one or more fulfillment actions can correspond to any specific actions performed by the user that causes the state of the one or more smart devices to change. The one or more smart devices can include, for example, computing devices of the user (e.g., mobile computing devices, in-vehicle computing devices, etc.), vehicle components of a vehicle of the user (e.g., a window defroster, power windows and doors, a radio, a blower, a heated seat, etc.), internet-of-things (IoT) devices of the user (e.g., a smart TV, a smart thermostat, a smart alarm system, a smart appliance, etc.), and/or any other smart devices with which the user can interact, thereby causing the state of the smart devices to change.

At block 454, the system obtains one or more contextual signals that characterize a state of the user at the given time instance and/or a state of an environment of the user at the given time instance. Put another way, the system obtains the one or more contextual signals at the same given time instance that the occurrence of the user interaction is identified to determine a contextual scenario that caused the user to perform the one or more fulfillment actions of the user interaction. The one or more contextual signals that characterize the state of the user at the given time instance can be based on user profile data of user profile(s) of the user, application data of application(s) accessible to the system, sensor data instances of sensor data generated by one or more sensors in the environment of the user (e.g., vehicle sensor(s), computing device sensor(s), home sensor(s), etc.), and/or any other contextual signals that characterize the state of the user. Further, the state of the user determined based on the one or more contextual signals can include, for example, a location or activity of the user (e.g., whether the user is located at a primary dwelling of the user, whether the user is driving a vehicle, etc.), a time of day at the location of the user, a day of week at the location of the user, and/or any other states of the user determined based on the one or more contextual signals. Further, the one or more contextual signals that characterize the state of the environment of the user at the given time instance can be based on sensor data instances of sensor data generated by one or more sensors in the environment of the user (e.g., vehicle sensor(s), computing device sensor(s), home sensor(s), etc.) and/or any other contextual signals that characterize the state of the environment of the user. Further, the state of the environment of the user determined based on the one or more contextual signals can include, for example, ambient noises detected in the environment of the user, an ambient indoor and/or outdoor temperature in the environment of the user, whether other users are co-located in the environment of the user (e.g., in the primary dwelling of the user, a passenger of the vehicle, etc.), and/or any other states of the environment of the user determined based on the one or more contextual signals.

At block 456, the system generates a given user training instance based on the user interaction at the given time instance and based on the one or more contextual signals at the given time instance. Further, the system can store the given user training instance in a training instance(s) database (e.g., the training instance(s) database 126A of FIG. 1). The given training instance can include training instance input and training instance output. The training instance input can include, for example, (i) the one or more contextual signals that characterize the state of the user at the given time instance and/or that characterize the state of the environment of the user at the given time instance, and (ii) a set of fulfillment actions associated with the one or more contextual signals. Notably, the set of fulfillment actions includes at least one or more fulfillment actions, corresponding to the user interaction, and at least one additional fulfillment action. In some implementations, the training instance input may include one or more terms or phrases that describe the one or more contextual signals and may be subsequently provided by the user (e.g., terms of "cold", "freezing", "chilly", etc.) to describe contextual scenario with low ambient temperatures. Put another way, the training instance input can include a given contextual scenario as indicated by the one or more contextual signals and a set of fulfillment actions that are predicted to be relevant with respect to the given contextual scenario. The set of fulfillment actions that are predicted to be relevant with respect to the given contextual scenario can be defined by a developer associated with the system, the user, and/or another actor. For instance, if an ambient temperature in an environment of the user is below X degrees (e.g., where X is a positive integer) as indicated by the one or more contextual signals, then the set of fulfillment actions can include actions that, when implemented, are in furtherance of increasing the ambient temperature in the environment of the user. Further, the training instance output can include the one or more fulfillment actions of the user interaction. Notably, the one or more fulfillment actions of the user interaction can include each of the fulfillment actions of the set of fulfillment actions or a subset thereof. Put another way, the training instance output can include the fulfillment actions that were, in fact, implemented by the user in the given contextual scenario.

In some implementations, and as indicated at block 456A, the system prompts the user to verify whether the one or more fulfillment actions were performed based on the state of the user at the given time instance and/or the state of the environment of the user at the given time instance prior to generating the given user training instance. For example, assume that a user manually turns on a heated seat in a vehicle. The system can identify the occurrence of the user manually turning on the heated seat as the user interaction that includes the fulfillment action for increasing an ambient temperature of the environment of the user. Further, the system can identify the ambient temperature of the environment of the user (e.g., inside the vehicle and/or outside the vehicle) as the one or more contextual signals at the given time instance that the user manually turned on the heated seat. In these implementations, and prior to generating a given training instance based on this user interaction, the system can prompt the user to verify whether the user manually turned on the heated seat because they were cold. In additional or alternative implementations, the system may simply infer this without prompting the user.

At block 458, the system determines whether one or more conditions are satisfied for training a fulfillment action model that is specific to the user. The one or more conditions for training the fulfillment action model that is specific to the user can include, for example, whether there is a threshold quantity of training instances available for training the fulfillment action model, a time of day, a day of week, and/or other conditions. For instance, in implementations where the system is implemented locally at a computing device of the user, the one or more conditions can additionally, or alternatively, include whether the computing device is charging, whether the computing device has at least a threshold state of charge, whether a temperature of the computing device is less than a threshold, whether the computing device is being held by the user. If, at an iteration of block 458, the system determines the one or more conditions are not satisfied, the system proceeds to block 460.

At block 460, the system determines whether there is a subsequent occurrence of the user interaction (e.g., that includes the same one or more fulfillment actions) or an additional user interaction that is in addition to the user interaction (e.g., that includes at least one unique fulfillment action as compared the one or more fulfillment actions of the user interaction). If, at an iteration of block 460, the system determines there is a subsequent occurrence of the user interaction or the additional user interaction, the system may return to block 452 and perform an additional iteration of the operations of blocks 452-458 with respect to the subsequent occurrence of the user interaction or the additional user interaction to generate an additional given user training instance, and to determine whether the one or more conditions are satisfied for training the fulfillment action model that is specific to the user. If, at an iteration of block 460 and/or a subsequent iteration, the system determines there is no subsequent occurrence of the user interaction or the additional user interaction, the system may return to block 458. Further, if, at an iteration of block 458, the system determines the one or more conditions are satisfied, the system proceeds to block 462. Put another way, the system may continuously monitor for occurrences of user interactions during a training phase and generate training instances based on those user interactions and/or continuously monitor for satisfaction of the one or more conditions until the system determines to train the fulfillment action model based on the training instances.

At block 462, the system causes a fulfillment action model that is specific to the user to be trained based on at least the given training instance. Further, the system can store the trained fulfillment action model in one or more databases accessible to the system (e.g., the fulfillment action model(s) and/or rule(s) database 127A of FIG. 1). At block 464, the system causes the fulfillment action model that is specific to the user to be utilized in responding to spoken utterances received from the user (e.g., as described with respect to FIG. 3). The fulfillment action model can be any suitable machine learning (ML) model that can be trained in any suitable manner including, for example, classification models (e.g., a support vector machine (SVM) model, a k-nearest neighbors (KNN) model, a naïve-Bayes model, etc.), regression models, and/or other types of ML models. For example, in training the fulfillment action model based on the given training instance generated at block 456, the system can process, using the fulfillment action model, the one or more contextual signals and the set of fulfillment actions included in the training instance input to generate predicted output. In this example, the predicted output can correspond to one or more predicted fulfillment actions, from the set of fulfillment actions, that the user is predicted to perform based on the given contextual scenario defined by the one or more contextual signals. Further, the one or more predicted fulfillment actions (or a representation thereof) of the predicted output can be compared to the one or more fulfillment actions (or a representation thereof) of the user interaction included in the training instance output to generate one or more losses. Moreover, the fulfillment action model can be updated based on the one or more losses. For instance, the one or more losses can be backpropagated across the fulfillment action model to update weight(s) thereof. Notably, this process can be repeated for a plurality of additional training instances generated in the manner described herein to further train and personalize the fulfillment action model that is specific to the user. Further, this process can be repeated for a plurality of different users to train and personalize corresponding fulfillment action models that are specific to those users.

In additional or alternative implementations, the system can present various contextual scenarios for presentation to the user, and request that the user identify one or more fulfillment actions that the user would perform given the various contextual scenarios. In these implementations, the system can generate training instances for training the fulfillment action model and/or for generating the fulfillment rule(s) based on how the user responds to the various contextual scenarios. For instance, the system can present an ambient temperature of a vehicle being low (e.g., a contextual scenario in which the user would be cold) and list various actions the user can perform responsive to the ambient temperature of the vehicle being low (e.g., training instance input of the given training instance described above). Further, the system can utilize user selections of one or more of the actions as training instance output.

In various implementations, the fulfillment action model and/or fulfillment rule(s) can be updated over time. For example, the system can continue generating training instances based on occurrences of user interactions that are identified at various time instances and the one or more contextual signals obtained at those various time instances. The system may update the fulfillment action model and/or fulfillment rule(s) whenever it is determined that the one or more conditions are subsequently satisfied. Also, for example, the system can update the fulfillment action model and/or fulfillment rule(s) based on changing contextual scenarios. For instance, during the fall season, the user may roll up one or more windows of a vehicle when cold, but not turn on any heated seats. However, as the fall season turns to the winter season, the user may have never had the windows down, but turn on the heated seats. Accordingly, not only is the fulfillment action model and/or fulfillment rule(s) specific to the user at a given time instance, but it is also updated over time to ensure better fulfillment of spoken utterances for the user.

In various implementations, the system can assign one or more voice commands to the training instances and/or fulfillment rule(s), such that the system can subsequently determine that spoken utterances received in the same or similar contextual scenarios are mapped to different fulfillment actions for the different users. For example, the one or more voice commands can include one or more terms or phrases that describe the one or more contextual signals and may be subsequently provided by the user. For instance, terms of "cold", "freezing", "chilly", etc. may be assigned to training instances and/or fulfillment rule(s) associated with contextual signals that indicate a low ambient temperature in the environment of the user when the one or more fulfillment actions of the user interaction are performed to increase the low ambient temperature in the environment. Also, for instance, terms of "hot", "scorching", "blistering", etc. may be assigned to training instances and/or fulfillment rule(s) associated with contextual signals that indicate a high ambient temperature in the environment of the user when the one or more fulfillment actions of the user interaction are performed to decrease the high ambient temperature in the environment. Also, for instance, terms of "dark", "dim", "pitch black", etc. may be assigned to training instances and/or fulfillment rule(s) associated with contextual signals that indicate the environment has low ambient light when the one or more fulfillment actions of the user interaction are performed to increase the ambient light in the environment. Accordingly, it should be understood that techniques described herein can not only be utilized to train the fulfillment action model(s) and/or generate the fulfillment rule(s) as described herein, but can also be utilized to assign one or more voice commands to certain contextual scenarios that may be encountered by the users.

In additional or alternative implementations, the system can generate a personalized mapping for the user that maps one or more voice commands to the one or more fulfillment actions (e.g., also referred to herein as fulfillment rule(s)). For example, the system can generate the personalized mapping based on the one or more past instances of the user causing performance of the one or more fulfillment actions corresponding to the user interaction in the contextual scenario and independent of providing any spoken utterances. Further, the system can determine that the contextual scenario is correlated to the one or more voice commands using various techniques. For instance, the system can map different contextual scenarios represented by different contextual signals that characterize the state of the user and/or that characterize the state of the environment when the one or more fulfillment actions are performed to different portions of a lower-dimensional space (e.g., an embedding space, a semantic space, etc.). Further, the one or more voice commands can be assigned to the different contextual scenarios in the lower-dimensional space. Accordingly, when a given voice command is subsequently included in a given spoken utterance received from the user, the system can determine a given contextual scenario associated with the given voice command in the lower-dimensional space, and cause one or more given fulfillment actions that were previously performed in the given contextual scenario to be implemented to satisfy the given spoken utterance. Also, for instance, the system can map different contextual scenarios represented by different contextual signals that characterize the state of the user and/or that characterize the state of the environment when the one or more fulfillment actions are performed to different intents. Further, the one or more voice commands can be assigned to the different intents. Accordingly, when a given voice command is subsequently included in a given spoken utterance received from the user, the system can determine a given contextual scenario associated with the given voice command determined based on a given intent, and cause one or more given fulfillment actions that were previously performed in the given contextual scenario to be implemented to satisfy the given spoken utterance.

In some versions of those implementations, the system may only generate the personalized mapping in response to determining that the one or more fulfillment actions were performed by the user in the contextual scenario a threshold quantity of instances (e.g., one time, three times, five times, and/or any other positive integer of one or greater than one). For example, assume that there have been three past instances of the user turning on a heated seat of a vehicle, but not a blower of the vehicle, when an ambient temperature inside the vehicle is between 45 degrees Fahrenheit and 60 degrees Fahrenheit, and that the three past instances satisfies the threshold quantity of instances. In this example, the system can map the contextual scenario (e.g., the ambient temperature inside the vehicle being between 45 degrees Fahrenheit and 60 degrees Fahrenheit) to a first portion of a lower-dimensional space and/or associated with a "cold" intent, and assigns voice commands of "cold", "freezing", or the like to the first portion of the lower-dimensional space and/or associated with the "cold" intent. Accordingly, even if the user did not provide any spoken utterances during the three past instances, when the user subsequently provides a spoken utterance of "I'm cold" when the ambient temperature inside the vehicle being between 45 degrees Fahrenheit and 60 degrees Fahrenheit, the system can utilize the personalize mapping to automatically turn on the heated seat.

Notably, in these implementations, the same voice command may be mapped to different fulfillment actions. Continuing with the above example, further assume that there have been three past instances of the user turning on the heated seat of the vehicle and the blower of the vehicle when the ambient temperature inside a vehicle is below 45 degrees Fahrenheit, and that the three past instances satisfies the threshold quantity of instances. In this example, the system can map the contextual scenario (e.g., the ambient temperature inside the vehicle being below 45 degrees Fahrenheit) to a disparate second portion of the lower-dimensional space and/or associated with the "cold" intent, and assigns voice commands of "cold", "freezing", or the like to the disparate second portion of the lower-dimensional space and/or associated with the "cold" intent. However, based on the different fulfillment actions performed by the user in these three instances (e.g., turning on both the heated seat of the vehicle and the blower of the vehicle), these past instances may be mapped to the disparate second portion of the lower-dimensional space, but associated with the same "cold" intent. Accordingly, even if the user did not provide any spoken utterances during the three past instances, when the user subsequently provides a spoken utterance of "I'm cold" when the ambient temperature inside the vehicle below 45 degrees Fahrenheit, the system can utilize the personalize mapping to automatically turn on the heated seat and automatically turn on the blower.

Although FIG. 4 is described herein with respect to particular user interactions having particular fulfillment actions, it should be understood that is for the sake of example and is not meant to be limiting. Further, although FIG. 4 is described herein with respect to training the fulfillment action model and/or generating the fulfillment rule(s) for a single user, it should be understood that is also for the sake of example and is not meant to be limiting. For instance, it should be understood that corresponding iterations of the method 400 of FIG. 4 can be implemented to train corresponding fulfillment action models and/or generate corresponding fulfillment rule(s) for multiple other users.

Figure 5A:
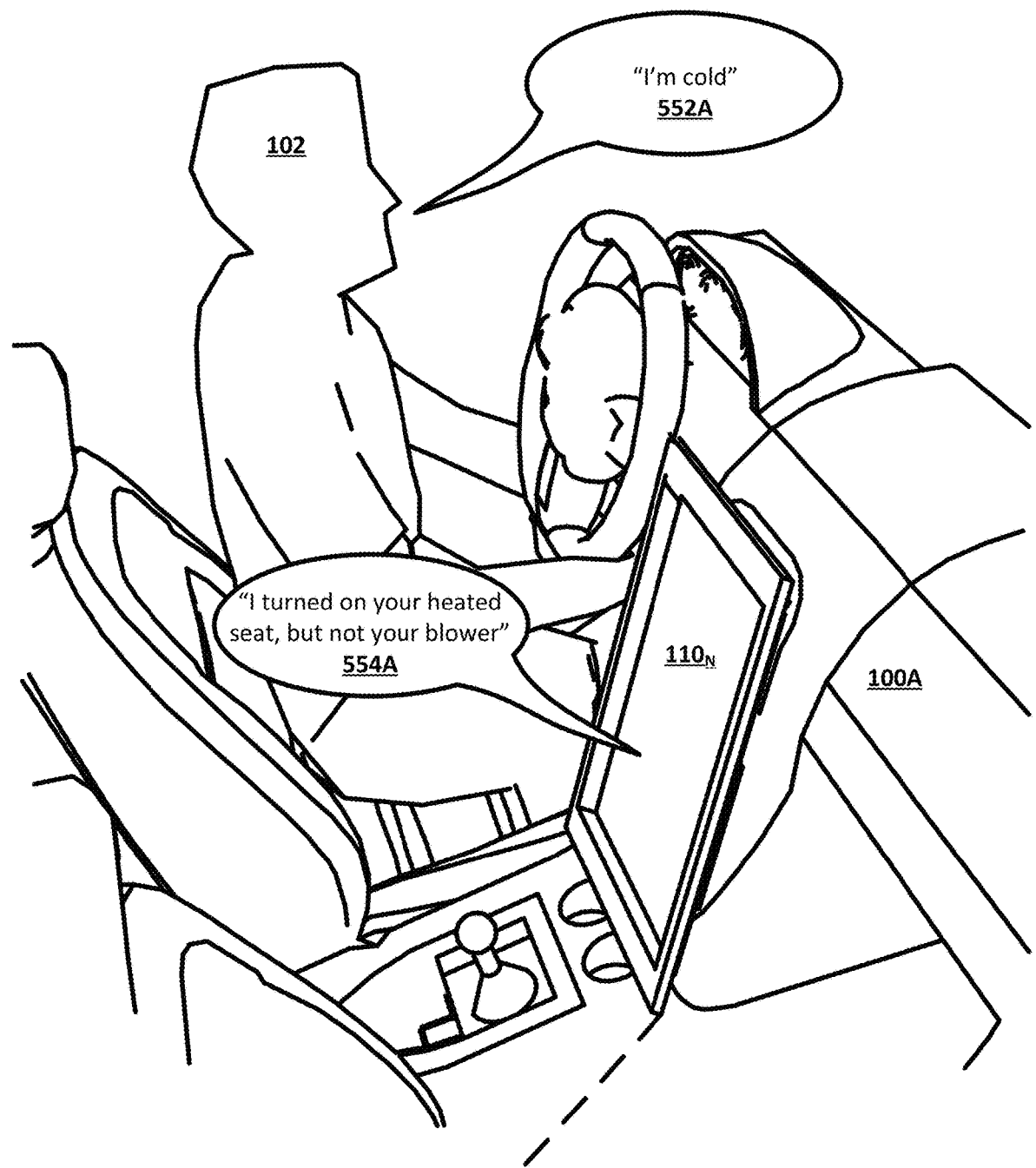
FIG. 5A and FIG. 5B depict various non-limiting examples of dynamically adapting fulfillment of a given spoken utterance in a vehicular environment based on a user that provided the given spoken utterance, in accordance with various implementations.
Figure 5B:
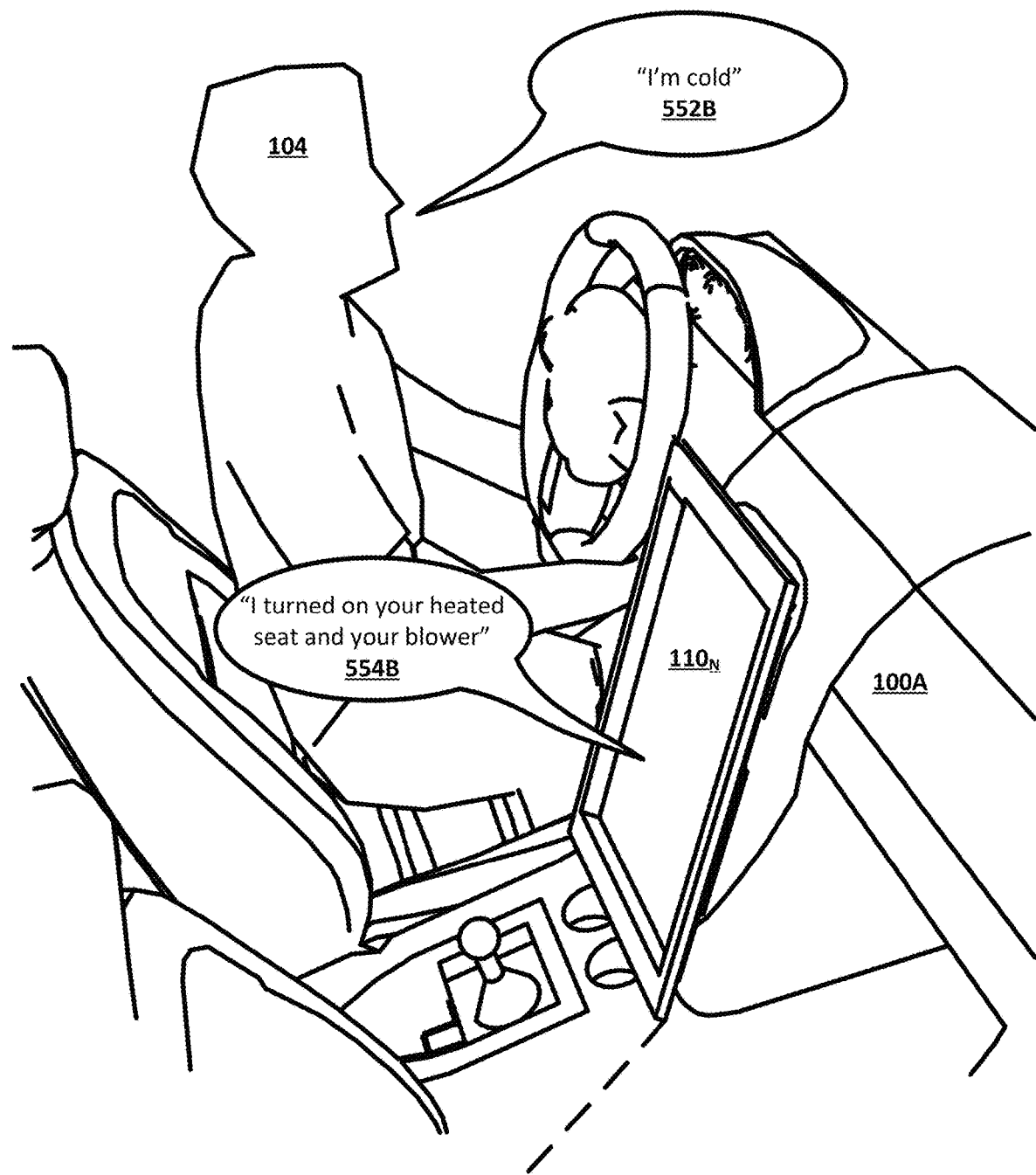

Turning now to FIGS. 5A and 5B, various non-limiting examples of dynamically adapting fulfillment of a given spoken utterance in a vehicular environment based on a user that provided the given spoken utterance is depicted. For the sake of example, assume that the vehicle 100A includes the in-vehicle computing device $110_N$ from FIG. 1, and assume that the vehicle is shared at least in part by multiple users—a first user 102 as shown in FIG. 5A and a second user 104 as shown in FIG. 5B. Further assume that action fulfillment models have been previously trained for both the first user 102 and the second user 104 and/or fulfillment rules have been previously generated for both the first user 102 and the second user 104. Accordingly, a fulfillment system (e.g., the fulfillment system 120 of FIG. 1) executing at least in part at the in-vehicle computing device $110_N$ of the vehicle 100A can utilize these fulfillment models and/or fulfillment rules that are specific to the first user 102 and the second user 104 in determining how to dynamically adapt fulfillment of spoken utterances.

Referring specifically to FIG. 5A, further assume that the first user 102 is driving the vehicle 100A and provides a spoken utterance 552A of "I'm cold", and further assume that microphone(s) of the in-vehicle computing device $110_N$ of the vehicle 100A generate audio data capturing the spoken utterance 552A. In this example, the audio data capturing the spoken utterance 552A can be processed using an ASR model to generate ASR data for the spoken utterance 552A (e.g., recognized text of "I'm cold"). Further, the ASR data for the spoken utterance 552A can be processed using an NLU model to generate NLU data for the spoken utterance 552A (e.g., recognized intent(s) of "cold", "increase temperature", or the like). Notably, the user that provided the spoken utterance 552A can be determined to correspond to the first user 102 using any techniques described herein and/or any other suitable technique.

In some implementations, the NLU data for the spoken utterance 552A can be processed using a fulfillment engine to determine a set of fulfillment actions that, when implemented, are in furtherance of increasing a temperature inside the vehicle 100A. The set of fulfillment actions can include, for example, rolling up the windows of the vehicle 100A (if the windows of the vehicle 100A are in a state indicating that they are rolled down) to increase a temperature inside the vehicle 100A, turning on a blower of the vehicle 100A to circulate warm air throughout the vehicle to increase a temperature inside the vehicle 100A, and turning on a heated seat of a seat occupied by the first user 100A to increase a temperature inside the vehicle 100A and/or a temperature of the first user 102 located in the vehicle 100A, and/or other fulfillment actions that can be performed to increase a temperature inside the vehicle 100A and/or a temperature of the first user 102 located in the vehicle 100A.

In these implementations, the set of fulfillment actions can be processed, using a fulfillment action model and/or fulfillment rule(s) that are specific to the first user 102, to select one or more first fulfillment actions to be implemented to satisfy the spoken utterance 552A. The spoken utterance and/or one or more contextual signals obtained at a time instance the spoken utterance was provided by the first user 102 can additionally, or alternatively, be processed, using the fulfillment action model and/or fulfillment rule(s) that are specific to the first user 102, in selecting the one or more first fulfillment actions to be implemented to satisfy the spoken utterance 552A. For example, the one or more first fulfillment actions can include turning on the heated seat of the seat occupied by the first user 102 to increase the temperature inside the vehicle 100A and/or the temperature of the first user 102 located in the vehicle 100A, but may not include turning on a blower of the vehicle 100A to circulate warm air throughout the vehicle to increase a temperature inside the vehicle 100A (e.g., as indicated by synthesized speech 554A of "I turned on your heated seat, but not your blower" that is audibly presented to the user via speaker(s) of the in-vehicle computing device $110_N$) based on output generated using the fulfillment action model and/or fulfillment rule(s) that are specific to the first user 102. Put another way, based on the output generated using fulfillment action model and/or fulfillment rule(s) that are specific to the first user 102, the fulfillment of the spoken utterance 552A is dynamically adapted to fulfillment action(s) that the first user 102 would manually perform in the same or similar contextual scenario.

In additional or alternative implementations, the one or more first fulfillment actions to be implemented to satisfy the spoken utterance 552A can be directly selected without considering the set of fulfillment actions (e.g., using the fulfillment rule(s)). For example, the one or more first fulfillment actions may be mapped to various voice commands that, when detected in a particular contextual scenario, cause the one or more first fulfillment actions to be implemented. For example, in generating the one or more fulfillment rules that are specific to the first user 102, a contextual scenario that matches the one depicted in FIG. 5A (e.g., the first user 102 being cold in the vehicle 100A) may have been encountered. Accordingly, voice commands that include the terms "cold", "freezing", etc. can be previously assigned to the one or more first fulfillment actions for the first user 102.

In contrast, and referring specifically to FIG. 5B, further assume that the second user 104 is driving the vehicle 100A and provides a spoken utterance 552B of "I'm cold". Notably, the spoken utterance 552B provided by the second user 104 in FIG. 5B is the same as the spoken utterance 552A provided by the first user 102 in FIG. 5A. The spoken utterance 552B of "I'm cold" provided by the second user 104 can be processed in the same or similar manner described above with respect to the spoken utterance 552A of FIG. 5A. However, it should be noted that one or more second fulfillment actions to be implemented to satisfy the spoken utterance 552B in FIG. 5B differ from the one or more first fulfillment actions to be implemented to satisfy the spoken utterance 552A in FIG. 5A. For example, the one or more second fulfillment actions can include turning on the heated seat of the seat occupied by the second user 104 to increase the temperature inside the vehicle 100A and/or the temperature of the first user 102 located in the vehicle 100A, and may also include turning on a blower of the vehicle 100A to circulate warm air throughout the vehicle to increase a temperature inside the vehicle 100A (e.g., as indicated by synthesized speech 554B of "I turned on your heated seat and your blower" that is audibly presented to the user via speaker(s) of the in-vehicle computing device $110_N$) based on output generated using the fulfillment action model and/or fulfillment rule(s) that are specific to the second user 104. Put another way, based on the output generated using fulfillment action model and/or fulfillment rule(s) that are specific to the second user 102, the fulfillment of the spoken utterance 552B is dynamically adapted to fulfillment action(s) that the second user 104 would manually perform in the same or similar contextual scenario.

Although FIGS. 5A and 5B are described with respect to the first user 102 and the second user 104 both driving the vehicle 100A at separate time instances, it should be understood that is for the sake of example and is not meant to be limiting. For example, techniques described herein can be utilized when both the first user 102 and the second user 104 are co-located in the vehicular environment. As one non-limiting example, assume that the first user 102 is driving the vehicle 100A and that the second user 104 is a passenger of the vehicle 100A. Put another way, the first user 102 may be associated with a "driver" zone of the vehicle 100A and the second user 104 may be associated with a "front passenger" zone of the vehicle 100A. These zones may be determined based on occupancy sensor(s) of the vehicle 100A, and/or any techniques described herein and/or any other suitable technique to identify the users in the vehicle 100A. Further assume that the first user 102 provides the same spoken utterance from FIG. 5A and FIG. 5B. In this example, a heated seat of the first user 102 in the "driver" zone may be turned on, but no other heated seats of the vehicle may be turned on and the blower may not be turned on as described with respect to the one or more first fulfillment actions of FIG. 5A. In some of these examples, a heated seat of the second user 104 and a blower associated with the "front passenger" zone may be turned on as described with respect to the one or more second fulfillment actions of FIG. 5B. However, any blower associated with the "driver zone" may remain off. Moreover, further assume that the second user 102 provides the same spoken utterance from FIG. 5A and FIG. 5B (e.g., before or after the first user 102 provides the same spoken utterance from FIG. 5A and FIG. 5B). In this example, a heated seat of the second user 102 in the "front passenger" zone may be turned on and the blower associated with the "front passenger" zone may be turned on as described with respect to FIG. 5B. Accordingly, in various implementations, the one or more fulfillment actions implemented for different users that are co-located in the environment may be restricted to a zone that is determined to be occupied by the user that provided the spoken utterance.

Figure 6A:
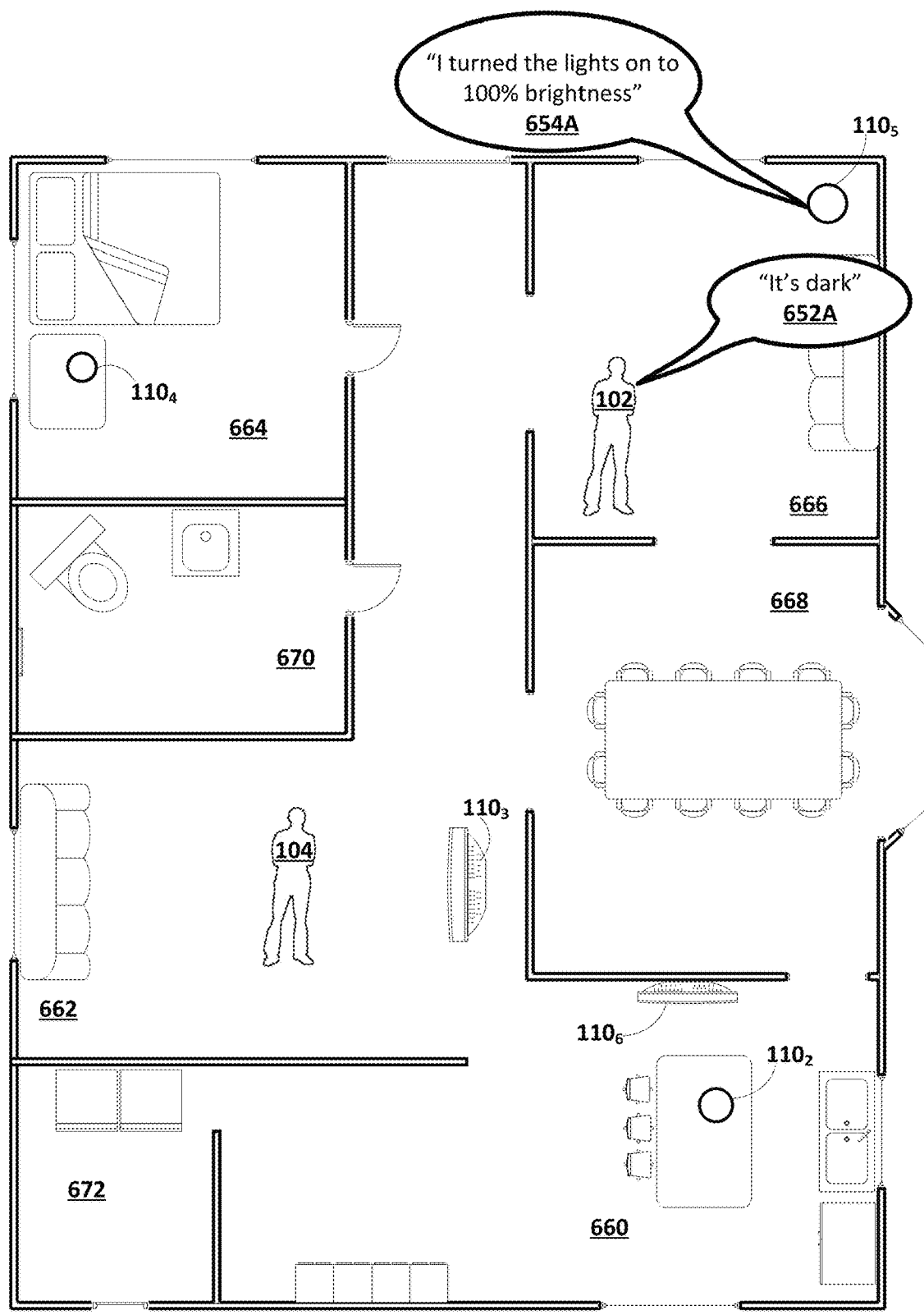
FIG. 6A and FIG. 6B depict various non-limiting examples of dynamically adapting fulfillment of a given spoken utterance in a primary dwelling environment based on a user that provided the given spoken utterance, in accordance with various implementations.
Figure 6B:
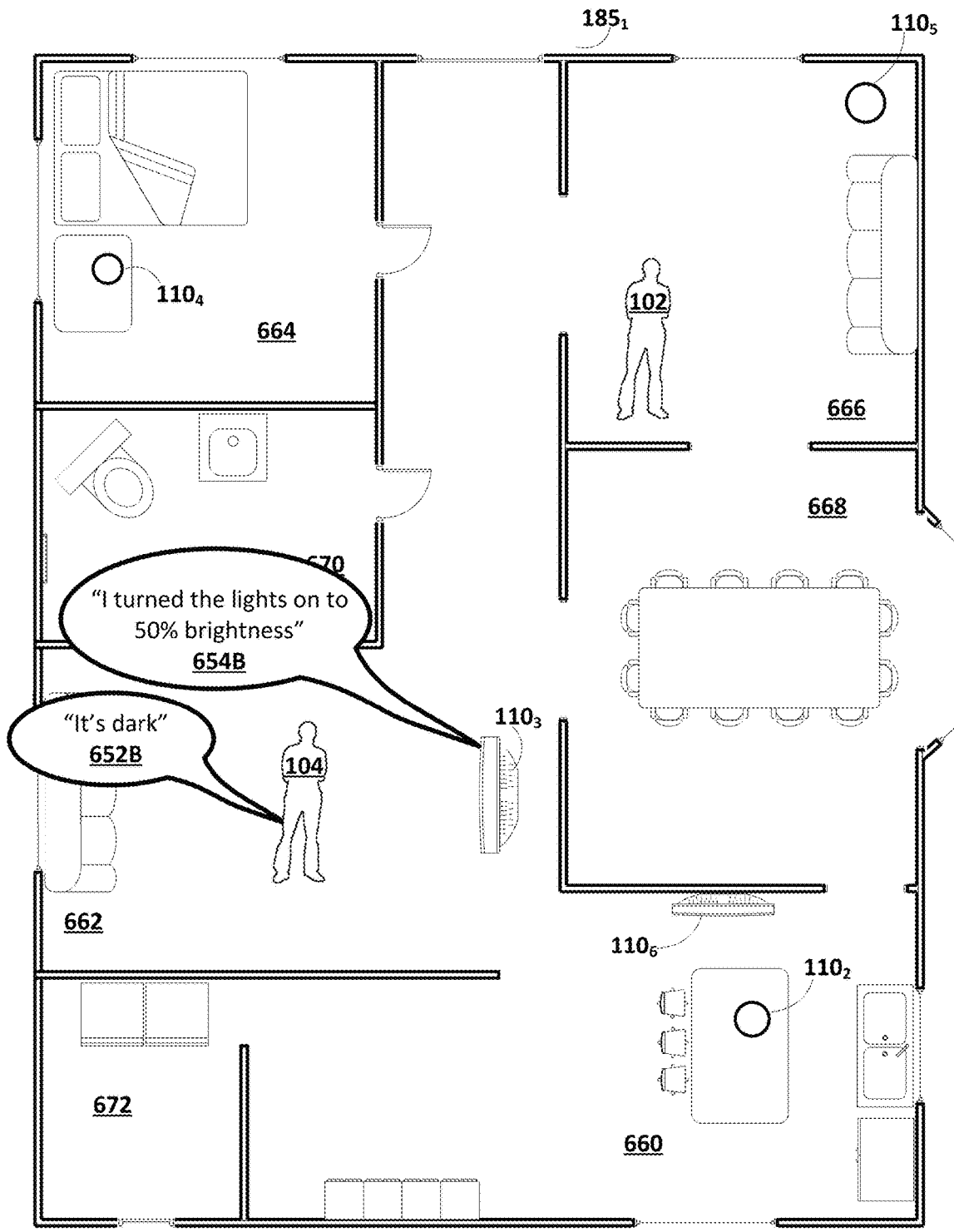

Turning now to FIGS. 6A and 6B, various non-limiting examples of dynamically adapting fulfillment of a given spoken utterance in a primary dwelling environment based on a user that provided the given spoken utterance is depicted. The floorplan depicted in FIGS. 6A and 6B includes a plurality of rooms, 660-672. A plurality of computing devices $110_{2-6}$ are deployed throughout at least some of the rooms. Each of the computing devices $110_{2-6}$ may implement an instance of a fulfillment system client (e.g., the fulfillment system client 114 of FIG. 1) configured with selected aspects of the present disclosure and may include one or more input devices, such as microphone(s) that are capable of capturing utterances spoken by a user nearby. For example, computing devices taking the form of interactive standalone speakers are deployed in room 660, which is a kitchen in FIGS. 6A and 6B (e.g., kitchen computing device $110_2$), room 664, which is a bedroom in FIGS. 6A and 6B (e.g., bedroom computing device $110_4$), and room 666, which is a living room in FIGS. 6A and 6B (e.g., living room computing device $110_4$). Further, computing devices taking the form of a so-called "smart" television are deployed in room 662, which is a den in FIGS. 6A and 6B (e.g., den TV $110_3$), and room 660, which is the kitchen in FIGS. 6A and 6B (e.g., kitchen TV $110_6$). Various users of the primary dwelling can interact with the plurality of computing devices $110_{2-6}$ to cause other smart device(s) of the primary dwelling to be controlled (e.g., causing the smart device(s) to change state(s)).

The smart devices of the primary dwelling depicted in FIGS. 6A and 6B may include, for example, smart light(s) in one or more of the rooms 660-672 of the primary dwelling, smart thermostat(s) in one or more of the rooms 660-672 of the primary dwelling, smart appliance(s) in 660, which is a kitchen in FIGS. 6A and 6B (e.g., a smart oven, a smart toaster, a smart refrigerator, etc.), smart appliance(s) in 672, which is a laundry room in FIGS. 6A and 6B (e.g., a smart washer, a smart dryer, etc.), smart lock(s) on door(s) of the primary dwelling, a smart alarm system of the primary dwelling (e.g., smart contact sensor(s), smart camera(s), smart motion sensor(s), etc.), and/or any other smart devices. Although particular smart devices are described herein with respect to the home environment of FIGS. 6A and 6B, it should be understood that is for the sake of example and is not meant to be limiting. For instance, and referring briefly back to FIGS. 5A and 5B, the vehicle 100A may also include a plurality of smart devices. These smart devices may include, but not be limited to, smart windows of the vehicle 100A, smart locks of the vehicle 100A, a smart defroster of the vehicle 100A, smart heated seats of the vehicle 100A, a smart infotainment system operating at the in-vehicle computing device $110_N$ of the vehicle, a smart blower system of the vehicle, and/or other smart devices that may be integrated with the vehicle 100A. In these examples, the user interaction that corresponds to the one or more fulfillment actions may include causing any of these smart devices to change states.

While not depicted in FIGS. 6A and 6B, the plurality of computing devices $106_{2-6}$ may be communicatively coupled with each other, the smart devices of the primary dwelling, and/or other resources (e.g., the Internet) via one or more wired or wireless WANs and/or LANs (e.g., via the network(s) 195 of FIG. 1). Additionally, other computing devices—particularly mobile devices such as smart phones, tablets, laptops, wearable devices, etc.—may also be present, e.g., carried by one or more persons in the home and may or may not also be connected to the same WANs and/or LANs. It should be understood that the configuration of computing devices and smart devices depicted in FIGS. 6A and 6B is just one example; more or fewer and/or different computing devices and/or smart devices may be deployed across any number of other rooms and/or areas of the primary dwelling, and/or in locations other than a residential home (e.g., a business, a hotel, a public place, an airport, a vehicle, and/or other locations or spaces).

For the sake of example of FIGS. 6A and 6B, assume that the home environment is cohabitated at least in part by multiple users—the first user 102 and the second user 104 as shown in FIGS. 6A and 6B. Further assume that fulfillment action models have been previously trained for both the first user 102 and the second user 104 and/or fulfillment rules have been previously generated for both the first user 102 and the second user 104. Accordingly, a fulfillment system (e.g., the fulfillment system 120 of FIG. 1) executing at least in part at one or more of the computing devices $110_{2-6}$ of the primary dwelling can utilize these fulfillment models and/or fulfillment rules that are specific to the first user 102 and the second user 104 in determining how to dynamically adapt fulfillment of spoken utterances.

Referring specifically to FIG. 6A, further assume that the first user 102 is located in room 666, which is the living room in FIGS. 6A and 6B, and provides a spoken utterance 652A of "It's dark", and further assume that microphone(s) of the living room computing device $110_5$ generate audio data capturing the spoken utterance 652A. In this example, the audio data capturing the spoken utterance 652A can be processed in the same or similar manner described with respect to FIGS. 5A and 5B to determine one or more fulfillment actions to be performed in response to receiving the spoken utterance 652A. Notably, the user that provided the spoken utterance 652A can be determined to correspond to the first user 102 using any techniques described herein and/or any other suitable technique. As a result, one or more first fulfillment actions may be implemented to make the living room less dark, such as turning on smart lights in the living room to 100% brightness (e.g., as indicated by synthesized speech 654A of "I turned the lights on to 100% brightness").

Referring specifically to FIG. 6B, further assume that the second user 104 is located in room 662, which is the den in FIGS. 6A and 6B, and provides a spoken utterance 652B of "It's dark", and further assume that microphone(s) of the den TV $110_3$ generate audio data capturing the spoken utterance 652B. In this example, the audio data capturing the spoken utterance 652B can be processed in the same or similar manner described with respect to FIGS. 5A and 5B to determine one or more fulfillment actions to be performed in response to receiving the spoken utterance 652B. Notably, the user that provided the spoken utterance 652A can be determined to correspond to the second user 104 using any techniques described herein and/or any other suitable technique. As a result, one or more second fulfillment actions may be implemented to make the den less dark, such as turning on smart lights in the den, but only to 50% brightness (e.g., as indicated by synthesized speech 654B of "I turned the lights on to 50% brightness").

Notably, the spoken utterances provided by the first user 102 and the second user 104 in FIGS. 6A and 6B are the same. However, fulfillment actions implemented in response to the spoken utterances differ in that the living room lights are turned on to 100% brightness based on the first user 102 providing the spoken utterance 652A and the den lights are turned on to 50% brightness based on the second user 104 providing the spoken utterance 652B. In some implementations, this difference in the fulfillment actions may be based on different fulfillment action models that have been previously trained for both the first user 102 and the second user 104 and/or fulfillment rules have been previously generated for both the first user 102 and the second user 104 as described with respect FIGS. 5A and 5B. In other implementations, this difference in the fulfillment actions may be based on the different zones in which the spoken utterances are received (e.g., a "living room" zone for the first user 102 and a "den" zone for the second user 104). Nonetheless, techniques described herein are utilized to dynamically adapt fulfillment of the same spoken utterance.

Figure 7:
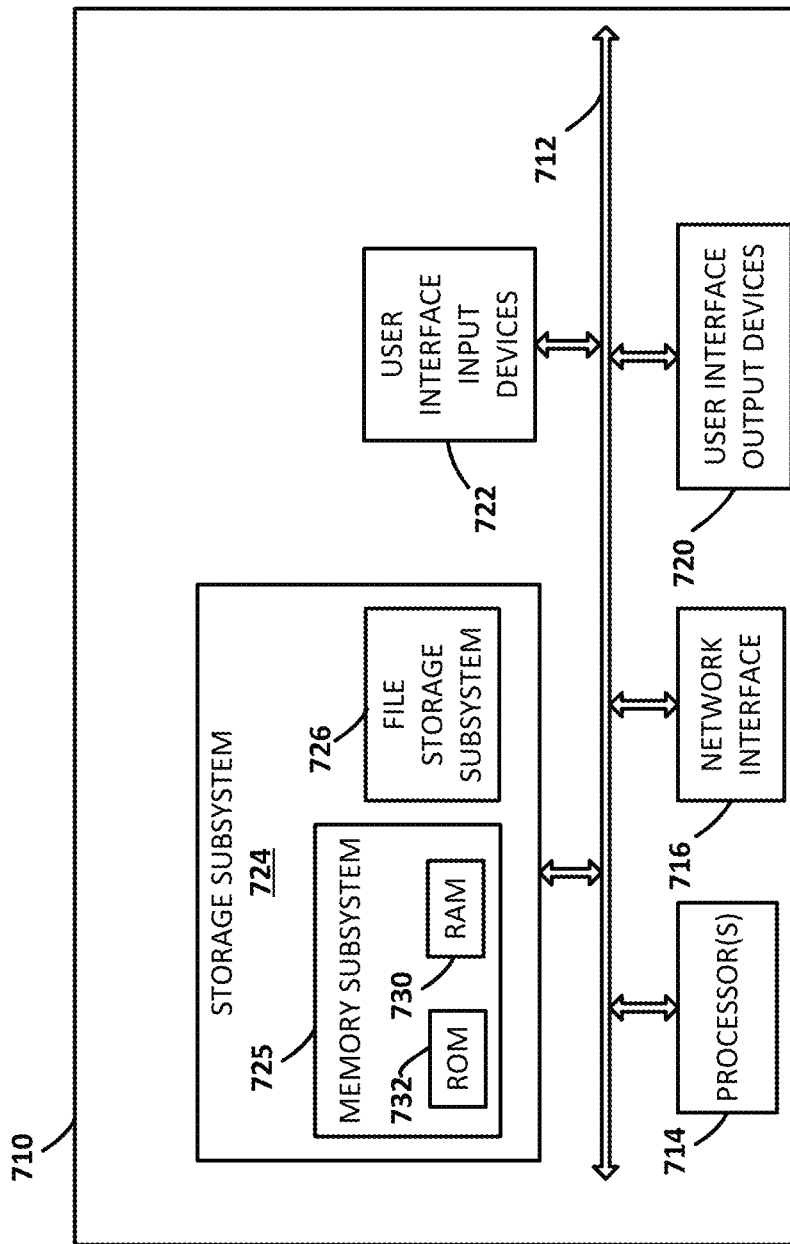
FIG. 7 depicts an example architecture of a computing device, in accordance with various implementations.

Turning now to FIG. 7, a block diagram of an example computing device 710 that may optionally be utilized to perform one or more aspects of techniques described herein is depicted. In some implementations, one or more computing devices, one or more vehicles, and/or other component(s) may comprise one or more components of the example computing device 710.

Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of the methods disclosed herein, as well as to implement various components depicted in FIGS. 1 and 2.

These software modules are generally executed by processor 714 alone or in combination with other processors. Memory 725 used in the storage subsystem 724 can include a number of memories including a main random-access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem 712 may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided, and includes receiving, from a user and via a computing device, a given spoken utterance, the given spoken utterance being provided while the user is located in a vehicle of the user; and determining, based on processing the given spoken utterance, a set of fulfillment actions. Each fulfillment action included in the set of fulfillment actions, when implemented, is in furtherance of satisfying the given spoken utterance. The method further includes determining whether the user that provided the given spoken utterance corresponds to a first user or a second user; and in response to determining that the user that provided the given spoken utterance corresponds to the first user: selecting, based on the user that provided the given spoken utterance corresponding to the first user, a subset of one or more first fulfillment actions from the set of fulfillment actions; and causing the subset of one or more first fulfillment actions to be implemented to satisfy the given spoken utterance.

These and other implementations of technology disclosed herein can optionally include one or more of the following features.

In some implementations, the method may further include, in response to determining that the user that provided the given spoken utterance corresponds to the second user: selecting, based on the user that provided the given spoken utterance corresponding to the second user, a subset of one or more second fulfillment actions from the set of fulfillment actions. The second user may be an additional user that is in addition to the first user, and the subset of one or more second fulfillment actions may include at least one fulfillment action that is not included in the subset of one or more first fulfillment actions. The method may further include causing the one or more second fulfillment actions to be implemented to satisfy the given spoken utterance.

In some versions of those implementations, the first user and the second user may be co-located in the vehicle when the given spoken utterance is received. Further, causing the subset of one or more first fulfillment actions to be implemented to satisfy the given spoken utterance may include implementing the one or more first fulfillment actions with respect to a first zone of the vehicle, of a plurality of zones of the vehicle, that is occupied by the first user, and causing the subset of one or more second fulfillment actions to be implemented to satisfy the given spoken utterance may include implementing the one or more second fulfillment actions with respect to a second zone of the vehicle, of the plurality of zones of the vehicle, that is occupied by the second user.

In additional or alternative versions of those implementations, selecting the subset of one or more first fulfillment actions from the set of fulfillment actions based on the user that provided the given spoken utterance corresponding to the first user may include processing, using a first user fulfillment action model that is specific to the first user and/or one or more first user fulfillment rules that are specific to the first user, the set of fulfillment actions to select the subset of one or more first fulfillment actions. In some further versions of those implementations, selecting the subset of one or more second fulfillment actions from the set of fulfillment actions based on the user that provided the given spoken utterance corresponding to the second user may include processing, using a second user fulfillment action model that is specific to the second user and/or one or more second user fulfillment rules that are specific to the second user, the set of fulfillment actions to select the subset of one or more second fulfillment actions.

In some implementations, the method may further include, subsequent to causing the subset of one or more first fulfillment actions to be implemented to satisfy the given spoken utterance: causing an indication of why the one or more first fulfillment actions were implemented to satisfy the given spoken utterance to be provided for presentation to the first user.

In some implementations, processing the given spoken utterance may include processing, using an automatic speech recognition (ASR) model, audio data that captures the given spoken utterance to generate ASR data for the given spoken utterance; and processing, using a natural language understanding (NLU) model, the ASR data for the given spoken utterance to generate NLU data for the given spoken utterance. In some versions of those implementations, determining the set of fulfillment actions based on processing the given spoken utterance may include determining, based on the NLU data for the given spoken utterance, the set of fulfillment actions.

In some implementations, determining whether the user that provided the given spoken utterance corresponds to the first user or the second user may include processing, using a speaker identification (SID) model, audio data that captures the given spoken utterance to determine whether the user that provided the given spoken utterance corresponds to the first user or the second user. In some versions of those implementations, processing, using the SID model, the audio data that captures the given spoken utterance to determine whether the user that provided the given spoken utterance corresponds to the first user or the second user may include, in response to determining that the spoken utterance is not a sufficient length to perform text independent (TI) SID: processing, using a text dependent (TD) SID model as the SID model, the audio data to generate a TD speaker embedding; comparing, in a TD SID embedding space, the TD speaker embedding to one or more stored TD speaker embeddings; and determining, based on comparing the TD speaker embedding to the one or more stored TD speaker embeddings, whether the user that provided the given spoken utterance corresponds to the first user or the second user. In some further versions of those implementations, processing, using the SID model, the audio data that captures the given spoken utterance to determine the identity of the user that provided the given spoken utterance may include, in response to determining that the spoken utterance is a sufficient length to perform TI SID: processing, using a TI SID model as the SID model, the audio data to generate a TI speaker embedding; comparing, in a TI SID embedding space, the TI speaker embedding to one or more stored TI speaker embeddings; and determining, based on comparing the TI speaker embedding to the one or more stored TI speaker embeddings, whether the user that provided the given spoken utterance corresponds to the first user or the second user. In some versions of those implementations, the audio data that captures the given spoken utterance may be generated via one or more microphones of the computing device.

In some implementations, determining whether the user that provided the given spoken utterance corresponds to the first user or the second user may include processing, using a face identification (FID) model, vision data that captures the user that provided the given spoken utterance to generate a face embedding; comparing, in a face embedding space, the face embedding to one or more stored face embeddings; and determining, based on comparing the face embedding to the one or more stored face embeddings, whether the user that provided the given spoken utterance corresponds to the first user or the second user. In some versions of those implementations, the vision data that captures the user that provided the given spoken utterance may be generated via one or more vision components of the computing device or an additional computing device that is communicatively coupled to the computing device.

In some implementations, determining whether the user that provided the given spoken utterance corresponds to the first user or the second user may include utilizing a corresponding device identifier of the computing device or an additional computing device that is communicatively coupled to the computing device to determine whether the user that provided the given spoken utterance corresponds to the first user or the second user.

In some implementations, determining whether the user that provided the given spoken utterance corresponds to the first user or the second user may include utilizing a corresponding user account of the computing device or an additional computing device that is communicatively coupled to the computing device to determine whether the user that provided the given spoken utterance corresponds to the first user or the second user.

In some implementations, a method implemented by one or more processors is provided, and includes receiving, from a user and via a computing device, a given spoken utterance, the given spoken utterance being provided while the user is located in a primary dwelling of the user; and determining, based on processing the given spoken utterance, a set of fulfillment actions. Each fulfillment action included in the set of fulfillment actions, when implemented, is in furtherance of satisfying the given spoken utterance. The method further includes determining whether the user that provided the given spoken utterance corresponds to a first user or a second user; and in response to determining that the user that provided the given spoken utterance corresponds to a first user: selecting, based on the user that provided the given spoken utterance corresponding to the first user, a subset of one or more first fulfillment actions from the set of fulfillment actions; and causing the subset of one or more first fulfillment actions to be implemented to satisfy the given spoken utterance.

In some implementations, a method implemented by one or more processors is provided, and includes identifying, at a given time instance of a plurality of time instances, an occurrence of a user interaction of a user with one or more smart devices, the user interaction corresponding to one or more fulfillment actions; obtaining one or more contextual signals that characterize a state of the user at the given time instance and/or that characterize a state of an environment of the user at the given time instance; generating a given training instance based on the user interaction and based on the one or more contextual signals; in response to determining that one or more training conditions are satisfied, causing a fulfillment action model that is specific to the user to be trained based on at least the given training instance; and causing the fulfillment action model that is specific to the user to be utilized in responding to spoken utterances received from the user.

These and other implementations of technology disclosed herein can optionally include one or more of the following features.

In some implementations, the method may further include, prior to generating the given training instance based on the user interaction and based on the one or more contextual signals: generating a prompt requesting that the user verify whether the one or more fulfillment actions were performed based on the state of the user at the given time instance and/or the state of the environment of the user at the given time instance; causing the prompt to be provided for presentation to the user; and receiving, responsive to the prompt, user input that verifies the one or more fulfillment actions were performed based on the state of the user at the given time instance and/or the state of the environment of the user at the given time instance. In some versions of those implementations, generating the given training instance based on the user interaction and based on the one or more contextual signals may be in response to receiving verification that the one or more fulfillment actions were performed based on the state of the user at the given time instance and/or the state of the environment of the user at the given time instance.

In some implementations, generating the given training instance based on the user interaction and based on the one or more contextual signals may include, for the given training instance, determining training instance input, the training instance input including (i) the one or more contextual signals that characterize the state of the user at the given time instance and/or that characterize the state of the environment of the user at the given time instance, and (ii) a set of fulfillment actions associated with the one or more contextual signals; and determining training instance output, the training instance output including the one or more fulfillment actions of the user interaction. In some versions of those implementations, causing the fulfillment action model that is specific to the user to be trained based on at least the given training instance may include processing, using the fulfillment action model, the training instance input to generate predicted output; comparing the predicted output to the training instance output to generate one or more losses; and updating the fulfillment action model based on the one or more losses.

In some implementations, the one or more training conditions may include a quantity of training instances available for training the fulfillment action model, a time of day, and/or a day of week.

In some implementations, the method may further include identifying, at an additional given time instance of the plurality of time instances, an occurrence of an additional user interaction of an additional user with the one or more smart devices, the additional user interaction corresponding to one or more additional fulfillment actions, and the one or more additional fulfillment actions including at least one fulfillment action that differs from the one or more fulfillment actions; obtaining one or more additional contextual signals that characterize an additional state of the additional user at the additional given time instance and/or that characterize an additional state of the environment of the additional user at the additional given time instance; generating an additional given training instance based on the additional user interaction and based on the one or more additional contextual signals; in response to determining that the one or more training conditions are satisfied, causing an additional fulfillment action model that is specific to the additional user to be trained based on at least the additional given training instance; and causing the additional fulfillment action model that is specific to the additional user to be utilized in responding to spoken utterances received from the additional user.

In some implementations, a method implemented by one or more processors is provided, and includes identifying, at a given time instance of a plurality of time instances, an occurrence of a user interaction of a user with one or more smart devices, the user interaction corresponding to one or more fulfillment actions; obtaining one or more contextual signals that characterize a state of the user at the given time instance and/or that characterize a state of an environment of the user at the given time instance; generating a prompt requesting that the user verify whether the one or more fulfillment actions were performed based on the state of the user at the given time instance and/or the state of the environment of the user at the given time instance; causing the prompt to be provided for presentation to the user; receiving, responsive to the prompt, user input that verifies the one or more fulfillment actions were performed based on the state of the user at the given time instance and/or the state of the environment of the user at the given time instance; in response to receiving the user input that verifies the one or more fulfillment actions were performed based on the state of the user at the given time instance and/or the state of the environment of the user at the given time instance, generating one or more fulfillment action rules that are specific to the user; and causing the one or more fulfillment action rules that are specific to the user to be utilized in responding to spoken utterances received from the user.

These and other implementations of technology disclosed herein can optionally include one or more of the following features.

In some implementations, the method may further include identifying, at an additional given time instance of the plurality of time instances, an occurrence of an additional user interaction of an additional user with the one or more smart devices, the additional user interaction corresponding to one or more additional fulfillment actions, and the one or more additional fulfillment actions including at least one fulfillment action that differs from the one or more fulfillment actions; obtaining one or more additional contextual signals that characterize an additional state of the additional user at the additional given time instance and/or that characterize an additional state of the environment of the additional user at the additional given time instance; generating an additional prompt requesting that the additional user verify whether the one or more additional fulfillment actions were performed based on the additional state of the additional user at the additional given time instance and/or the additional state of the environment of the additional user at the additional given time instance; causing the additional prompt to be provided for presentation to the additional user; receiving, responsive to the additional prompt, additional user input that verifies the one or more additional fulfillment actions were performed based on the additional state of the additional user at the additional given time instance and/or the additional state of the environment of the user at the additional given time instance; in response to receiving the additional user input that verifies the one or more additional fulfillment actions were performed based on the additional state of the additional user at the additional given time instance and/or the additional state of the environment of the additional user at the additional given time instance, generating one or more additional fulfillment action rules that are specific to the additional user; and causing the one or more additional fulfillment action rules that are specific to the additional user to be utilized in responding to spoken utterances received from the additional user.

In some implementations, a method implemented by one or more processors is provided, and includes generating a personalized mapping, for a user, of one or more voice commands to one or more fulfillment actions. Generating the personalized mapping is in response to determining one or more past instances of the user causing performance of the one or more fulfillment actions independent of providing any spoken utterances and in contextual scenarios that are determined to be correlated with the one or more voice commands. The method further includes receiving, from the user and subsequent to generating the personalized mapping, a given spoken utterance; determining, based on processing the given spoken utterance, that the given spoken utterance is one of the one or more of the voice commands; in response to determining that the given utterance is one of the one or more voice commands: using the personalized mapping to cause the one or more fulfillment actions to be automatically implemented.

These and other implementations of technology disclosed herein can optionally include one or more of the following features.

In some implementations, generating the personalized mapping of the one or more voice commands to the one or more fulfillment actions may include generating a mapping, in a semantic space, and based on the one or more past instances, between a voice command semantic representation of the one or more voice commands and a fulfillment action semantic representation of the one or more fulfillment actions; and storing the mapping in one or more data bases.

In some implementations, generating the personalized mapping of the one or more voice commands to the one or more fulfillment actions may include generating, based on the one or more past instances, a mapping between an intent of the one or more voice commands and the one or more fulfillment actions; and storing the mapping in one or more databases.

In some implementations, a method implemented by one or more processors is provided, and includes identifying, at a given time instance of a plurality of time instances, an occurrence of a user interaction of a user with one or more smart devices, the user interaction corresponding to one or more fulfillment actions; and obtaining one or more contextual signals that characterize a contextual scenario of the user. The one or more contextual signals that characterize the contextual scenario of the user characterize a state of the user at the given time instance and/or characterize a state of an environment of the user at the given time instance. The method further includes identifying one or more voice commands to assign to the contextual scenario of the user. The one or more voice commands, when subsequently provided by the user, cause the one or more fulfillment actions of the user interaction to be implemented. The method further includes receiving, from the user and at a subsequent time instance of the plurality of time instances, an instance of a given spoken utterance, the subsequent time instance being subsequent to the given time instance; determining, based on processing the instance of the given spoken utterance, that the instance of the given spoken utterance includes one or more of the voice commands; determining to cause the one or more fulfillment actions to be implemented to satisfy the instance of the given spoken utterance; and causing the one or more fulfillment actions to be implemented to satisfy the instance of the given spoken utterance.

These and other implementations of technology disclosed herein can optionally include one or more of the following features.

In some implementations, the method may further include identifying, at a further subsequent time instance of the plurality of time instances, an additional occurrence of an additional user interaction of an additional user with the one or more smart devices, the additional user interaction corresponding to one or more additional fulfillment actions, the one or more additional fulfillment actions including at least one fulfillment action that differs from the one or more fulfillment actions, and the further subsequent time instance being subsequent to the given time instance; and obtaining one or more additional contextual signals that characterize an additional contextual scenario of the additional user. The one or more additional contextual signals that characterize the additional contextual scenario of the additional user may characterize an additional state of the additional user at the further subsequent time instance and/or characterize an additional state of the environment of the additional user at the further subsequent time instance, and the additional contextual scenario of the additional user may match the contextual scenario of the user. The method may further include identifying the one or more voice commands to assign to the additional contextual scenario of the additional user. The one or more voice commands, when subsequently provided by the additional user, may cause the one or more additional fulfillment actions of the additional user interaction to be implemented. The method may further include receiving, from the additional user and at a yet further subsequent time instance of the plurality of time instances, an additional instance of the given spoken utterance, the yet further subsequent time instance being subsequent to the further subsequent time instance; determining, based on processing the additional instance of the given spoken utterance, that the additional instance of the given spoken utterance includes one or more of the voice commands; determining to cause the one or more additional fulfillment actions to be implemented to satisfy the additional instance of the given spoken utterance; and causing the one or more additional fulfillment actions to be implemented to satisfy the additional instance of the given spoken utterance.

In addition, some implementations include one or more processors (e.g., central processing unit(s) (CPU(s)), graphics processing unit(s) (GPU(s)), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods. Some implementations also include a computer program product including instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

What is claimed is:

1. A method implemented by one or more processors comprising:
   receiving, from a user and via a computing device, a given spoken utterance, the given spoken utterance being provided while the user is located in a vehicle of the user;
   determining, based on processing the given spoken utterance, a set of fulfillment actions, wherein each fulfillment action included in the set of fulfillment actions, when implemented, is in furtherance of satisfying the given spoken utterance, and wherein each fulfillment action included in the set of fulfillment actions is associated with controlling a corresponding component of the vehicle;
   determining whether the user that provided the given spoken utterance corresponds to a first user or a second user;
   in response to determining that the user that provided the given spoken utterance corresponds to the first user:
      selecting, based on the user that provided the given spoken utterance corresponding to the first user, a subset of one or more first fulfillment actions from the set of fulfillment actions, wherein the subset of one or more first fulfillment actions is associated with controlling at least a first component of the vehicle; and
      causing the subset of one or more first fulfillment actions to be implemented to satisfy the given spoken utterance; and
   in response to determining that the user that provided the given spoken utterance corresponds to the second user:
      selecting, based on the user that provided the given spoken utterance corresponding to the second user, a subset of one or more second fulfillment actions from the set of fulfillment actions, wherein the second user is an additional user that is in addition to the first user and wherein the subset of one or more second fulfillment actions is associated with controlling at least a second component of the vehicle that is not controlled when the subset of the one or more first fulfilment actions is implemented; and
      causing the one or more second fulfillment actions to be implemented to satisfy the given spoken utterance.

2. The method of claim 1,
   wherein the first user and the second user are co-located in the vehicle when the given spoken utterance is received,
   wherein causing the subset of one or more first fulfillment actions to be implemented to satisfy the given spoken utterance comprises implementing the one or more first fulfillment actions with respect to a first zone of the vehicle, of a plurality of zones of the vehicle, that is occupied by the first user, and
   wherein causing the subset of one or more second fulfillment actions to be implemented to satisfy the given spoken utterance comprises implementing the one or more second fulfillment actions with respect to a second zone of the vehicle, of the plurality of zones of the vehicle, that is occupied by the second user.

3. The method of claim 1, wherein selecting the subset of one or more first fulfillment actions from the set of fulfillment actions based on the user that provided the given spoken utterance corresponding to the first user comprises:
   processing, using a first user fulfillment action model that is specific to the first user and/or one or more first user fulfillment rules that are specific to the first user, the set of fulfillment actions to select the subset of one or more first fulfillment actions.

4. The method of claim 3, wherein selecting the subset of one or more second fulfillment actions from the set of fulfillment actions based on the user that provided the given spoken utterance corresponding to the second user comprises:
processing, using a second user fulfillment action model that is specific to the second user and/or one or more second user fulfillment rules that are specific to the second user, the set of fulfillment actions to select the subset of one or more second fulfillment actions.

5. The method of claim 1, in response to determining that the user that provided the given spoken utterance corresponds to the first user, further comprising:
subsequent to causing the subset of one or more first fulfillment actions to be implemented to satisfy the given spoken utterance:
causing an indication of why the one or more first fulfillment actions were implemented to satisfy the given spoken utterance to be provided for presentation to the first user.

6. The method of claim 1, wherein processing the given spoken utterance comprises:
processing, using an automatic speech recognition (ASR) model, audio data that captures the given spoken utterance to generate ASR data for the given spoken utterance; and
processing, using a natural language understanding (NLU) model, the ASR data for the given spoken utterance to generate NLU data for the given spoken utterance.

7. The method of claim 6, wherein determining the set of fulfillment actions based on processing the given spoken utterance comprises:
determining, based on the NLU data for the given spoken utterance, the set of fulfillment actions.

8. The method of claim 1, wherein determining whether the user that provided the given spoken utterance corresponds to the first user or the second user comprises:
processing, using a speaker identification (SID) model, audio data that captures the given spoken utterance to determine whether the user that provided the given spoken utterance corresponds to the first user or the second user.

9. The method of claim 8, wherein processing, using the SID model, the audio data that captures the given spoken utterance to determine whether the user that provided the given spoken utterance corresponds to the first user or the second user comprises:
in response to determining that the spoken utterance is not a sufficient length to perform text independent (TI) SID:
processing, using a text dependent (TD) SID model as the SID model, the audio data to generate a TD speaker embedding;
comparing, in a TD SID embedding space, the TD speaker embedding to one or more stored TD speaker embeddings; and
determining, based on comparing the TD speaker embedding to the one or more stored TD speaker embeddings, whether the user that provided the given spoken utterance corresponds to the first user or the second user.

10. The method of claim 9, wherein processing, using the SID model, the audio data that captures the given spoken utterance to determine the identity of the user that provided the given spoken utterance comprises:
in response to determining that the spoken utterance is a sufficient length to perform TI SID:
processing, using a TI SID model as the SID model, the audio data to generate a TI speaker embedding;
comparing, in a TI SID embedding space, the TI speaker embedding to one or more stored TI speaker embeddings; and
determining, based on comparing the TI speaker embedding to the one or more stored TI speaker embeddings, whether the user that provided the given spoken utterance corresponds to the first user or the second user.

11. The method of claim 8, wherein the audio data that captures the given spoken utterance is generated via one or more microphones of the computing device.

12. The method of claim 1, wherein determining whether the user that provided the given spoken utterance corresponds to the first user or the second user comprises:
processing, using a face identification (FID) model, vision data that captures the user that provided the given spoken utterance to generate a face embedding;
comparing, in a face embedding space, the face embedding to one or more stored face embeddings; and
determining, based on comparing the face embedding to the one or more stored face embeddings, whether the user that provided the given spoken utterance corresponds to the first user or the second user.

13. The method of claim 12, wherein the vision data that captures the user that provided the given spoken utterance is generated via one or more vision components of the computing device or an additional computing device that is communicatively coupled to the computing device.

14. The method of claim 1, wherein determining whether the user that provided the given spoken utterance corresponds to the first user or the second user comprises:
utilizing a corresponding device identifier of the computing device or an additional computing device that is communicatively coupled to the computing device to determine whether the user that provided the given spoken utterance corresponds to the first user or the second user.

15. The method of claim 1, wherein determining whether the user that provided the given spoken utterance corresponds to the first user or the second user comprises:
utilizing a corresponding user account of the computing device or an additional computing device that is communicatively coupled to the computing device to determine whether the user that provided the given spoken utterance corresponds to the first user or the second user.

16. A method implemented by one or more processors comprising:
receiving, from a user and via a computing device, a given spoken utterance, the given spoken utterance being provided while the user is located in a primary dwelling of the user;
determining, based on processing the given spoken utterance, a set of fulfillment actions, wherein each fulfillment action included in the set of fulfillment actions, when implemented, is in furtherance of satisfying the given spoken utterance, and wherein each fulfillment action included in the set of fulfillment actions is associated with controlling a corresponding Internet-of-Thing (IoT) device and using a corresponding set of parameters;

determining whether the user that provided the given spoken utterance corresponds to a first user or a second user;

in response to determining that the user that provided the given spoken utterance corresponds to a first user:

selecting, based on the user that provided the given spoken utterance corresponding to the first user, a subset of one or more first fulfillment actions from the set of fulfillment actions, wherein the subset of one or more first fulfillment actions is associated with controlling the corresponding IoT device using a first set of parameters; and causing the subset of one or more first fulfillment actions to be implemented to satisfy the given spoken utterance; and in response to determining that the user that provided the given spoken utterance corresponds to the second user:

selecting, based on the user that provided the given spoken utterance corresponding to the second user, a subset of one or more second fulfillment actions from the set of fulfillment actions, wherein the second user is an additional user that is in addition to the first user and wherein the subset of one or more second fulfillment actions is associated with controlling the corresponding IoT device using a second set of parameters that differs from the first set of parameters; and causing the one or more second fulfillment actions to be implemented to satisfy the given spoken utterance.

17. The method of claim 16,
wherein the first user and the second user are co-located in the primary dwelling when the given spoken utterance is received.

18. The method of claim 16,
wherein selecting the subset of one or more first fulfillment actions from the set of fulfillment actions based on the user that provided the given spoken utterance corresponding to the first user comprises:
processing, using a first user fulfillment action model that is specific to the first user and/or one or more first user fulfillment rules that are specific to the first user, the set of fulfillment actions to select the subset of one or more first fulfillment actions; and wherein selecting the subset of one or more second fulfillment actions from the set of fulfillment actions based on the user that provided the given spoken utterance corresponding to the second user comprises:
processing, using a second user fulfillment action model that is specific to the second user and/or one or more second user fulfillment rules that are specific to the second user, the set of fulfillment actions to select the subset of one or more second fulfillment actions.

19. The method of claim 16, in response to determining that the user that provided the given spoken utterance corresponds to the first user, further comprising:

subsequent to causing the subset of one or more first fulfillment actions to be implemented to satisfy the given spoken utterance:
causing an indication of why the one or more first fulfillment actions were implemented to satisfy the given spoken utterance to be provided for presentation to the first user.

20. A system comprising:
at least one processor; and
memory storing instructions that, when executed, cause the at least one processor to be operable to:
receive, from a user and via a computing device, a given spoken utterance, the given spoken utterance being provided while the user is located in a vehicle of the user;

determine, based on processing the given spoken utterance, a set of fulfillment actions, wherein each fulfillment action included in the set of fulfillment actions, when implemented, is in furtherance of satisfying the given spoken utterance, and wherein each fulfillment action included in the set of fulfillment actions is associated with controlling a corresponding component of the vehicle;

determine whether the user that provided the given spoken utterance corresponds to a first user or a second user;

in response to determining that the user that provided the given spoken utterance corresponds to the first user:

select, based on the user that provided the given spoken utterance corresponding to the first user, a subset of one or more first fulfillment actions from the set of fulfillment actions, wherein the subset of one or more first fulfillment actions is associated with controlling at least a first component of the vehicle; and cause the subset of one or more first fulfillment actions to be implemented to satisfy the given spoken utterance; and in response to determining that the user that provided the given spoken utterance corresponds to the second user:

select, based on the user that provided the given spoken utterance corresponding to the second user, a subset of one or more second fulfillment actions from the set of fulfillment actions, wherein the second user is an additional user that is in addition to the first user and wherein the subset of one or more second fulfillment actions is associated with controlling at least a second component of the vehicle that is not controlled when the subset of the one or more first fulfilment actions is implemented; and cause the one or more second fulfillment actions to be implemented to satisfy the given spoken utterance.

* * * * *